(12) United States Patent
Wada

(10) Patent No.: US 10,931,865 B2
(45) Date of Patent: Feb. 23, 2021

(54) FOCUS ADJUSTMENT FUNCTION OF IMAGING DEVICE, FOCUS ADJUSTMENT FUNCTION OF IMAGING DEVICE MAIN BODY, AND FOCUS ADJUSTMENT METHOD OF IMAGING DEVICE

(71) Applicant: FUJIFILM Corporation, Tokyo (JP)

(72) Inventor: Tetsu Wada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/824,187

(22) Filed: Mar. 19, 2020

(65) Prior Publication Data

US 2020/0221017 A1    Jul. 9, 2020

Related U.S. Application Data

(63) Continuation of application No. PCT/JP2018/032914, filed on Sep. 5, 2018.

(30) Foreign Application Priority Data

Sep. 20, 2017 (JP) .............................. JP2017-180245

(51) Int. Cl.
| | | |
|---|---|---|
| *H04N 5/232* | (2006.01) | |
| *G03B 17/14* | (2021.01) | |
| *G03B 13/36* | (2021.01) | |

(52) U.S. Cl.
CPC ......... *H04N 5/23212* (2013.01); *G03B 17/14* (2013.01); *G03B 13/36* (2013.01)

(58) Field of Classification Search
CPC combination set(s) only.
See application file for complete search history.

(56) References Cited

U.S. PATENT DOCUMENTS 5,969,760 A * 10/1999 Ernest ...................... G02B 7/28
                                                          348/219.1
6,689,998 B1    2/2004 Bremer
(Continued)

FOREIGN PATENT DOCUMENTS

| JP | 63-93277 A | 4/1988 |
| JP | 2006-145813 A | 6/2006 |

(Continued)

OTHER PUBLICATIONS

International Search Report issued in PCT/JP2018/032914 (PCT/ISA/210), dated Dec. 4, 2018.
(Continued)

*Primary Examiner* — Gary C Vieaux
(74) *Attorney, Agent, or Firm* — Birch, Stewart, Kolasch & Birch, LLP

(57) ABSTRACT

Provided are an imaging device, an imaging device main body, and a focusing control method of an imaging device capable of adjusting a focus with high accuracy by appropriately supporting the focus adjustment in a manual manner. An image sensor movement driver (220) that moves an image sensor (210) along an optical axis (L), and an image sensor movement controller (250a) that controls the movement of the image sensor (210) by controlling the image sensor movement driver (220) are provided. In a case where a subject is focused, the image sensor movement controller (250a) starts the tracking, and controls the movement of the image sensor (210) such that a focusing state is maintained based on a defocus amount detected by the phase difference AF processing unit (132).

11 Claims, 15 Drawing Sheets

(56) References Cited

U.S. PATENT DOCUMENTS

| | | | |
|---|---|---|---|
| 10,230,881 B2* | 3/2019 | Bull | H04N 7/10 |
| 2006/0110150 A1 | 5/2006 | Kurosawa | |
| 2009/0322931 A1* | 12/2009 | Cheng | H04N 5/2251 |
| | | | 348/345 |
| 2015/0029355 A1* | 1/2015 | Kim | H04N 5/23229 |
| | | | 348/222.1 |
| 2015/0062409 A1* | 3/2015 | Tsuzuki | H04N 5/23212 |
| | | | 348/342 |
| 2016/0080635 A1* | 3/2016 | Ishii | H04N 5/23212 |
| | | | 348/353 |
| 2016/0234422 A1* | 8/2016 | Inata | H04N 5/23212 |
| 2017/0289436 A1* | 10/2017 | Katsuyama | H04N 5/23212 |
| 2018/0146131 A1* | 5/2018 | Kikuchi | H04N 5/2252 |

FOREIGN PATENT DOCUMENTS

| | | |
|---|---|---|
| JP | 2010-107866 A | 5/2010 |
| JP | 2014-48545 A | 3/2014 |
| JP | 2016-6940 A | 1/2016 |
| JP | 2016-148832 A | 8/2016 |

OTHER PUBLICATIONS

Written Opinion of the International Searching Authority issued in PCT/JP2018/032914 (PCT/ISA/237), dated Dec. 4, 2018.

* cited by examiner

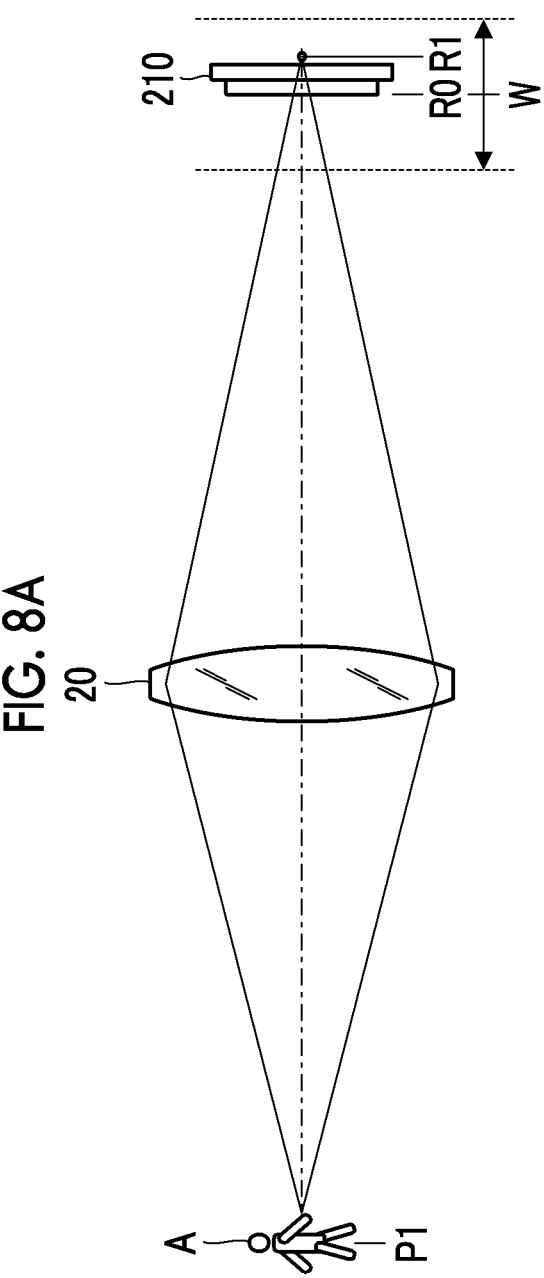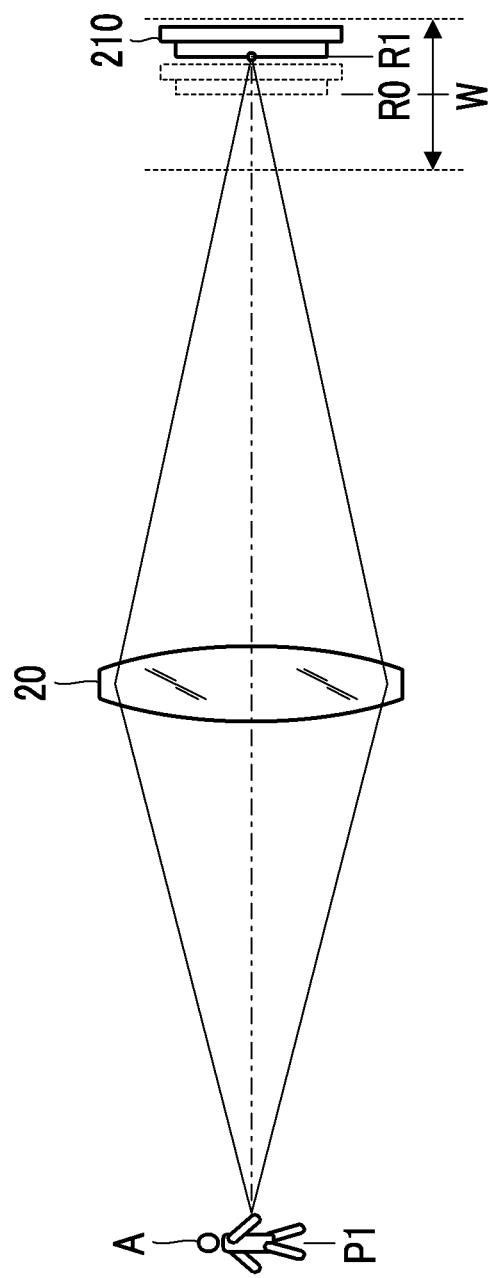

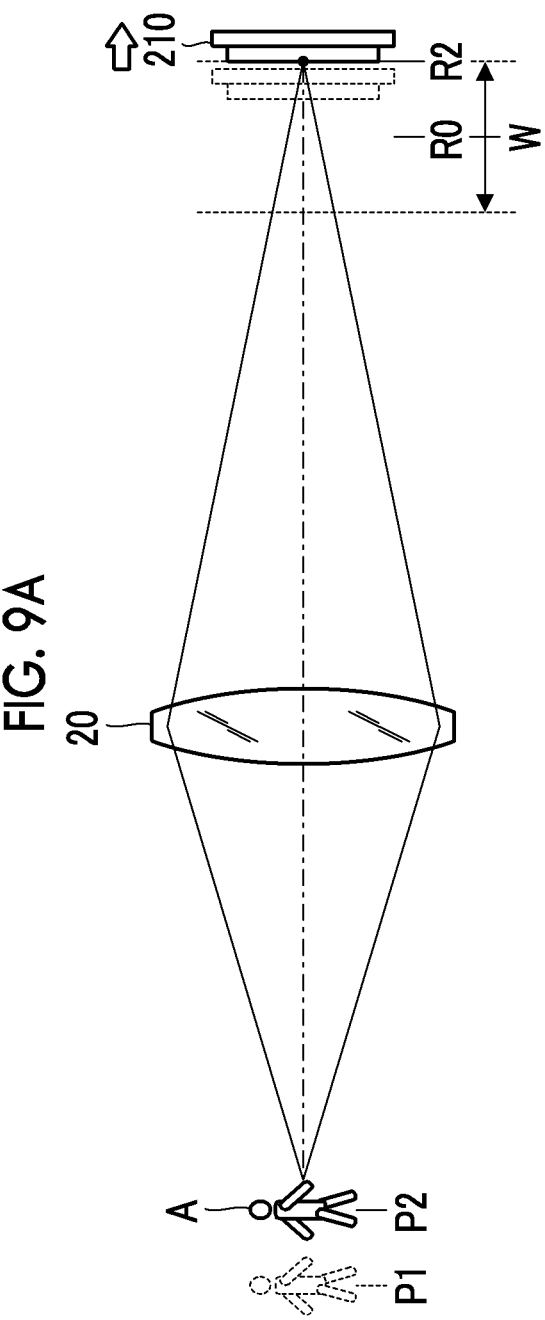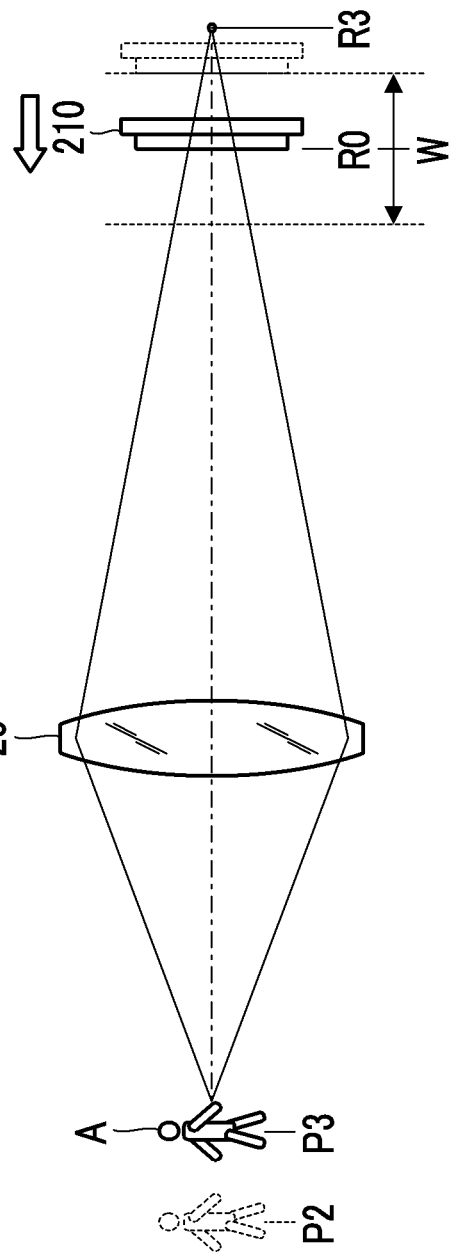

FOCUS ADJUSTMENT FUNCTION OF IMAGING DEVICE, FOCUS ADJUSTMENT FUNCTION OF IMAGING DEVICE MAIN BODY, AND FOCUS ADJUSTMENT METHOD OF IMAGING DEVICE

CROSS-REFERENCE TO RELATED APPLICATIONS

The present application is a Continuation of PCT International Application No. PCT/JP2018/032914 filed on Sep. 5, 2018 claiming priority under 35 U.S.C § 119(a) to Japanese Patent Application No. 2017-180245 filed on Sep. 20, 2017. Each of the above applications is hereby expressly incorporated by reference, in its entirety, into the present application.

BACKGROUND OF THE INVENTION

1. Field of the Invention

The present invention relates to an imaging device, an imaging device main body, and a focusing control method of an imaging device, and particularly to an imaging device, an imaging device main body, and a focusing control method of an imaging device which has a function of adjusting a focus by moving an image sensor.

2. Description of the Related Art

In an imaging device having no autofocus (AF) function, a focus is manually adjusted. Even in an imaging device having an AF function, a photographer may manually adjust the focus by turning off the AF function.

JP2016-148832A suggests an imaging device having a function of performing contrast AF by moving an image sensor back and forth in a case where a photographer pushes an AF button after a focus is manually adjusted, as a function of supporting manual focus adjustment.

SUMMARY OF THE INVENTION

However, the imaging device of JP2016-148832A has a disadvantage that it is difficult to appropriately adjust the focus even though the AF is operated in a case where a subject moves.

The present invention has been made in view of such circumstances, and an object of the present invention is to provide an imaging device, an imaging device main body, and a focusing control method of an imaging device capable of performing focusing with high accuracy by appropriately supporting manual focusing.

Means for Solving the Aforementioned Problems are as Follows (1) An imaging device comprises an imaging lens that has a focus adjustment function, an image sensor that images a subject via the imaging lens, an image sensor movement drive unit (image sensor movement driver) that moves the image sensor along an optical axis, a focus detection unit (focus detector) that detects a defocus amount, and an image sensor movement controller that controls the movement of the image sensor to track the subject based on the defocus amount detected by the focus detection unit in a case where the subject is focused.

According to the present aspect, the image sensor can adjust the focus by moving along the optical axis. The movement of the image sensor is controlled by the image sensor movement controller. In a case where the subject is focused, the image sensor movement controller tracks the subject. That is, the movement of the image sensor is controlled so as to maintain the focusing state. Accordingly, at the time of performing manual focus adjustment, the focusing can be appropriately supported, and the focusing can be performed with high accuracy. In particular, at the time of performing manual focus adjustment of the moving subject, the focusing can be appropriately supported, and the focusing can be performed with high accuracy.

(2) In the imaging device according to (1), the image sensor movement controller ends the tracking of the subject in a case where the image sensor reaches an end portion of a movable range, and returns the image sensor to a reference position.

According to the present aspect, in a case where the image sensor reaches the end portion of the movable range, the tracking of the subject is ended. In a case where the tracking is ended, the image sensor is returned to the reference position. The movable range after the focusing is performed can be equally set back and forth by setting the reference position at the center or near the center of the movable range of the image sensor. Accordingly, followability can be improved.

The movable range of the image sensor can be optionally set within a range in which the image sensor movement drive unit can physically move the image sensor. Therefore, it is possible to set the movable range of the image sensor to be narrower than the range in which the image sensor can be physically moved. A trackable range can be widened by setting the movable range to be wide. In a case where the focusing is performed by using a display unit such as an electronic viewfinder, it is preferable that the movable range is set with consideration for resolution. That is, it is preferable that the movable range is set such that the range that cannot be adjusted only by the display on the electronic viewfinder can be adjusted by moving the image sensor.

(3) In the imaging device according to (2), the image sensor movement controller returns the image sensor to the reference position by moving the image sensor at a moving speed corresponding to a change of the defocus amount.

According to the present aspect, at the time of returning the image sensor to the reference position, the image sensor is returned to the reference position by moving at the moving speed corresponding to the change in the defocus amount. In a case where the image sensor is returned to the reference position, since the focus state is changed, there is a concern that an unnatural image is obtained. However, the image sensor can be returned to the reference position without giving a uncomfortable feeling to the image by moving the image sensor as in the present aspect.

(4) In the imaging device according to (3), the reference position of the image sensor is set at a flange back position defined by the imaging lens.

According to the present aspect, the reference position of the image sensor is set at the flange back position. In general, the imaging lens is designed so as to have the best performance at the flange back position. Therefore, a high-quality image can be captured by setting the reference position as the flange back position and performing the following control by using the reference position as a reference. The "flange back position" mentioned herein includes a position substantially regarded as a flange back position, that is, a position regarded as a substantially flange back position.

(5) In the imaging device according to (1), the image sensor movement controller ends the tracking of the subject in a case where the image sensor reaches an end portion of a movable range, and causes the image sensor to stand by at a position of the end portion until the subject is focused again.

According to the present aspect, in a case where the image sensor reaches the end portion of the movable range, the tracking of the subject is ended. In a case where the tracking is ended, the image sensor stands by at the position of the end portion until the focusing is performed again. Accordingly, even though the position of the imaging plane is out of the movable range, it is possible to easily return to the focusing state.

(6) In the imaging device according to any one of (1) to (5), the focus detection unit detects the defocus amount based on outputs of a plurality of phase difference detection pixels formed on an imaging surface of the image sensor.

According to the present aspect, the defocus amount is detected based on the outputs of the plurality of phase difference detection pixels formed on the imaging surface of the image sensor. Accordingly, the amount of movement of the image sensor for focusing on the subject can be easily obtained. Therefore, it is possible to accelerate the AF, and it is possible to improve the followability.

(7) In the imaging device according to any one of (1) to (6), the image sensor movement controller determines that the focusing is performed in a case where the defocus amount detected by the focus detection unit is continuously equal to or less than a threshold value for a predetermined time.

According to the present aspect, in a case where the defocus amount is continuously equal to or less than the threshold value for the predetermined time, it is determined that the focusing is performed. Accordingly, the tracking can be started from a state almost substantially close to the focusing. Accordingly, the convenience can be improved.

(8) In the imaging device according to any one of (1) to (6), the image sensor movement controller determines that the focusing is performed in a case where the defocus amount detected by the focus detection unit is continuously equal to or less than a first threshold value for a predetermined time and a change amount of the defocus amount detected by the focus detection unit is continuously equal to or less than a second threshold value for a predetermined time.

According to the present aspect, in a case where the defocus amount is continuously equal to or less than the first threshold value for the predetermined time and the amount of change of the defocus amount is continuously equal to or less than the second threshold value for the predetermined time, it is determined that the focusing is performed. That is, in a case where the focus adjustment is almost not performed in the vicinity of the focusing, it is considered that the focusing is performed, and the tracking is started. Accordingly, the tracking can be started from a state almost substantially close to the focusing. Accordingly, the convenience can be improved.

(9) The imaging device according to any one of (1) to (8) further comprises a tracking mode manual switching unit (tracking mode manual switcher) that manually switches between turned-on and turned-off of a tracking mode. The image sensor movement controller controls the movement of the image sensor to track the subject in a case where the tracking mode is turned on.

According to the present aspect, it is possible to manually set the turned-on and turned-off of the function of tracking the subject. Accordingly, the convenience can be further improved.

(10) The imaging device according to any one of (1) to (8) further comprises a tracking mode automatic switching unit (tracking mode automatic switcher) that turns on a tracking mode in a case where the focusing is continued for a predetermined time. The image sensor movement controller controls the movement of the image sensor to track the subject in a case where the tracking mode is turned on.

According to the present aspect, the function of tracking the subject is automatically turned on. Specifically, the tracking mode is automatically turned on after the focusing is continuously performed for the predetermined time. Accordingly, the convenience can be further improved.

(11) The imaging device according to any one of (1) to (10) further comprises a monitor or an electronic viewfinder on which an image captured by the image sensor is displayed in real time. Resolution of the monitor and the electronic viewfinder is lower than resolution of the image sensor.

According to the present aspect, the monitor or the electronic viewfinder is provided. The image captured by the image sensor is displayed in real time on the monitor and electronic viewfinder. In a case where the resolution of the monitor and the electronic viewfinder is lower than the resolution of the image sensor, it is difficult to perform the manual focusing with high accuracy while confirming the display on the monitor and the electronic viewfinder. Therefore, in such a case, the AF supporting based on the movement of the image sensor particularly effectively acts.

The resolution mentioned herein is synonymous with pixel density, and is expressed in, for example, pixel per inch (ppi). ppi is fineness of a grid representing the image, and generally represents the number of pixels per inch.

(12) An imaging device main body comprises a mount to which an imaging lens having a focus adjustment function is attached, an image sensor that images a subject via the imaging lens, an image sensor movement drive unit that moves the image sensor along an optical axis, a focus detection unit that detects a defocus amount, and an image sensor movement controller that controls the movement of the image sensor to track the subject based on the defocus amount detected by the focus detection unit in a case where the subject is focused.

According to the present aspect, the image sensor can adjust the focus by moving along the optical axis. The movement of the image sensor is controlled by the image sensor movement controller. In a case where the subject is focused, the image sensor movement controller tracks the subject. That is, the movement of the image sensor is controlled so as to maintain the focusing state. Accordingly, at the time of performing manual focus adjustment, the focusing can be appropriately supported, and the focusing can be performed with high accuracy. In particular, at the time of performing manual focus adjustment of the moving subject, the focusing can be appropriately supported, and the focusing can be performed with high accuracy.

(13) In the imaging device main body according to (12), the image sensor movement controller ends the tracking of the subject in a case where the image sensor reaches an end portion of a movable range, and returns the image sensor to a reference position.

According to the present aspect, the tracking is ended in a case where the image sensor reaches the end portion of the movable range. In a case where the tracking is ended, the image sensor is returned to the reference position. The movable range after the focusing is performed can be equally set back and forth by setting the reference position at the center or near the center of the movable range of the image sensor. Accordingly, followability can be improved.

(14) In the imaging device main body according to (12), the image sensor movement controller ends the tracking of the subject in a case where the image sensor reaches an end portion of a movable range, and causes the image sensor to stand by at a position of the end portion until the subject is focused again.

According to the present aspect, the tracking is ended in a case where the image sensor reaches the end portion of the movable range. In a case where the tracking is ended, the image sensor stands by at the position of the end portion until the focusing is performed again. Accordingly, even though the position of the imaging plane is out of the movable range, it is possible to easily return to the focusing state.

(15) A focusing control method of an imaging device includes an imaging lens which has a focus adjustment function, an image sensor which images a subject via the imaging lens, an image sensor movement drive unit which moves the image sensor along an optical axis, and a focus detection unit which detects a defocus amount. The method comprises a step of determining whether or not the subject is focused, and a step of controlling the movement of the image sensor to track the subject based on the defocus amount detected by the focus detection unit in a case where the subject is focused.

According to the present aspect, the image sensor can adjust the focus by moving along the optical axis. The movement of the image sensor is controlled by the image sensor movement controller. In a case where the subject is focused, the image sensor movement controller tracks the subject. That is, the movement of the image sensor is controlled so as to maintain the focusing state. Accordingly, at the time of performing manual focus adjustment, the focusing can be appropriately supported, and the focusing can be performed with high accuracy. In particular, at the time of performing manual focus adjustment of the moving subject, the focusing can be appropriately supported, and the focusing can be performed with high accuracy.

(16) The focusing control method of an imaging device according to (15) further comprises a step of ending the tracking of the subject in a case where the image sensor reaches an end portion of a movable range, and returning the image sensor to a reference position.

According to the present aspect, the tracking is ended in a case where the image sensor reaches the end portion of the movable range. In a case where the tracking is ended, the image sensor is returned to the reference position. The movable range after the focusing is performed can be equally set back and forth by setting the reference position at the center or near the center of the movable range of the image sensor. Accordingly, followability can be improved.

(17) The focusing control method of an imaging device according to (15) further comprises a step of ending the tracking of the subject in a case where the image sensor reaches an end portion of a movable range, and causing the image sensor to stand by at a position of the end portion until the subject is focused again.

According to the present aspect, the tracking is ended in a case where the image sensor reaches the end portion of the movable range. In a case where the tracking is ended, the image sensor stands by at the position of the end portion until the focusing is performed again. Accordingly, even though the position of the imaging plane is out of the movable range, it is possible to easily return to the focusing state.

According to the present invention, manual focusing can be appropriately supported and focusing can be performed with high accuracy.

BRIEF DESCRIPTION OF THE DRAWINGS

FIGS. 8A and 8B are conceptual diagrams of a case where focusing is performed by moving the image sensor.

FIGS. 9A and 9B are conceptual diagrams of tracking control based on the movement of an image sensor.

FIG. 11 is a flowchart showing a processing procedure of the tracking control in a case where a tracking mode is turned on.

FIG. 13 is a flowchart showing a processing procedure of the tracking control in a case where the tracking mode is turned on.

DESCRIPTION OF THE PREFERRED EMBODIMENTS

Hereinafter, preferred embodiments for carrying out the present invention will be described in detail with reference to the accompanying drawings.

♦♦First Embodiment♦♦

[Appearance Configuration]

Figure 1:
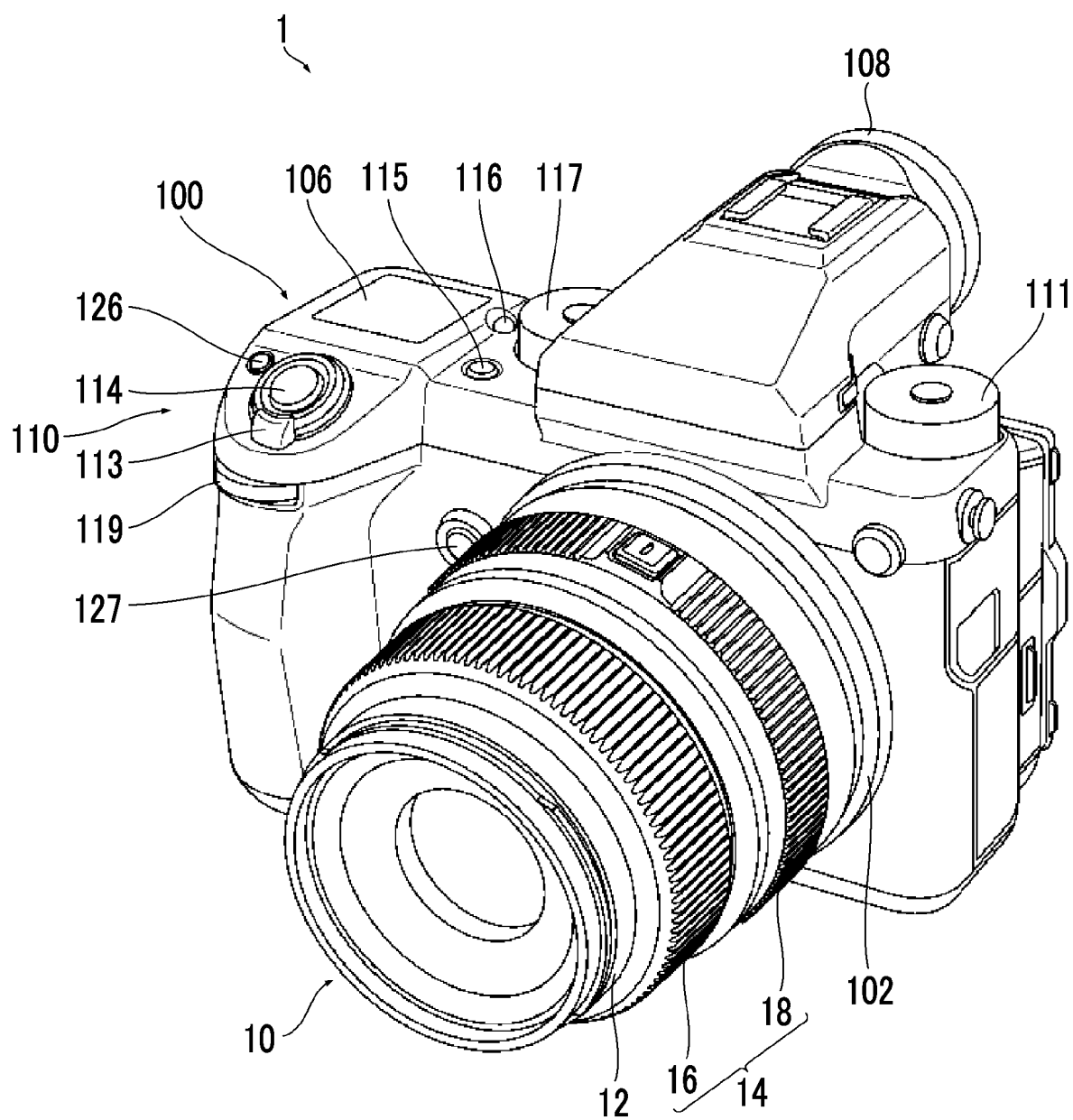
FIG. 1 is a front perspective view showing an embodiment of a digital camera.
Figure 2:
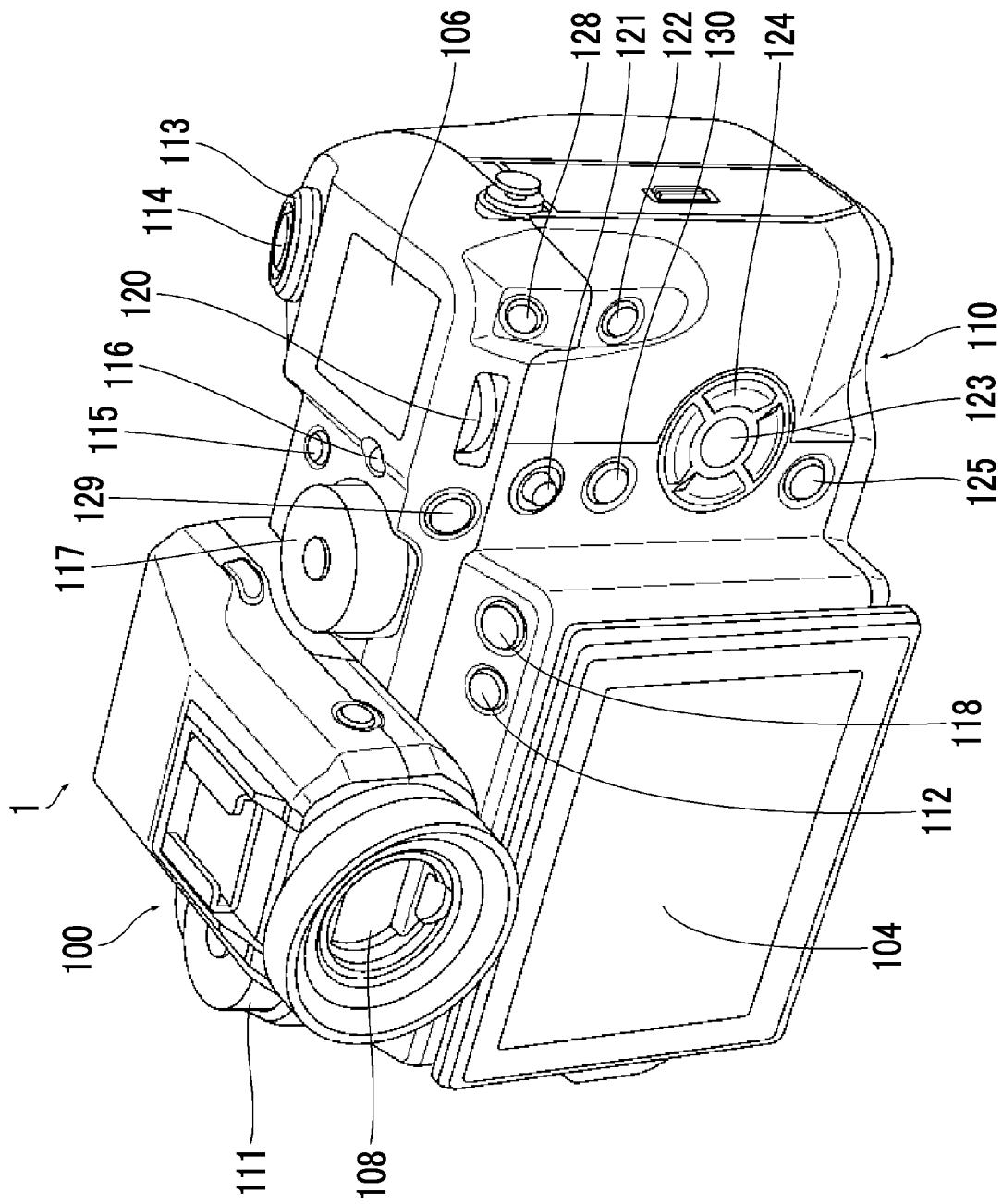
FIG. 2 is a rear perspective view showing an embodiment of the digital camera.

FIGS. 1 and 2 are a front perspective view and a rear perspective view showing an embodiment of a digital camera to which the present invention is applied.

A digital camera 1 shown in FIGS. 1 and 2 is an interchangeable lens type digital camera, and comprises an interchangeable lens 10 and a camera main body 100. The digital camera 1 is an example of an imaging device.

<<Interchangeable Lens>>

The interchangeable lens 10 is an example of an imaging lens, and is a combination of a plurality of lenses. The interchangeable lens 10 has a focus adjustment function, and a focus is adjusted by moving some lens groups or all lens groups along an optical axis. In the present example, the focus is adjusted by moving a focus lens composed of some lens groups along the optical axis.

The interchangeable lens 10 comprises a focus ring 16 and a stop ring 18, as a lens operation unit 14.

The focus ring 16 is an operation member for focus adjustment. The focus ring 16 is provided to be rotatable around a lens barrel 12. In a case where the focus ring 16 is rotated, a focus adjustment mechanism is operated according to an operation direction and an operation amount. That is, the focus lens moves according to the operation direction and the operation amount, and the focus is adjusted.

The stop ring 18 is an operation member for adjusting a stop. The stop ring 18 is provided to be rotatable around the lens barrel 12. F numbers capable of being set on an outer periphery of the stop ring 18 are printed at regular intervals (not shown). The setting of the stop is performed by rotating the stop ring 18 and adjusting the F number desired to be set at a position of an index (not shown) provided on the lens barrel 12.

<<Camera Main Body>>

A camera main body 100 is an example of an imaging device main body. The camera main body 100 comprises a mount 102, a main monitor 104, a sub monitor 106, an electronic viewfinder 108, and a camera operation unit 110.

The mount 102 is an attachment unit of the interchangeable lens 10, and is provided on a front surface of the camera main body 100. The interchangeable lens 10 is attachable and detachable to and from the mount 102.

The main monitor 104 is provided on a rear surface of the camera main body 100. The main monitor 104 includes a liquid crystal display (LCD). The main monitor 104 is used as a graphical user interface (GUI) at the time of performing various settings, and is also used as a monitor for reproducing captured images. At the time of imaging, a live view is displayed as necessary, and an image captured by an image sensor is displayed in real time.

The sub monitor 106 is provided on an upper surface of the camera main body 100. The sub monitor 106 includes an LCD. The sub monitor 106 displays main imaging information such as shutter speed, an F number, sensitivity, and exposure correction.

The electronic viewfinder (EVF) 108 is provided on an upper portion of the camera main body 100. The live view is displayed on the electronic viewfinder 108, and the image captured by the image sensor in real time is displayed. The electronic viewfinder 108 can be turned on and off as necessary, and can be switched to the display of the main monitor 104.

The camera operation unit 110 comprises, as operation members of the digital camera 1, a sensitivity dial 111, a delete button 112, a power lever 113, a shutter button 114, a drive button 115, a sub monitor illumination button 116, a shutter speed dial 117, a playback button 118, a front command dial 119, a rear command dial 120, a focus lever 121, a quick menu button 122, a menu/OK button 123, a selector button 124, a display/BACK button 125, a first function button 126, a second function button 127, a third function button 128, a fourth function button 129, and a fifth function button 130.

The sensitivity dial 111 is a dial for setting sensitivity. The delete button 112 is a button for deleting the captured image. In a case where the button is pushed during the reproduction of the image, the image being reproduced is deleted. The power lever 113 is a lever that turns on and off the power of the digital camera 1. The shutter button 114 is a button for instructing recording of an image. The shutter button 114 is a two-stroke button capable of being pushed halfway and fully. In a case where the shutter button 114 is pushed halfway, an S1ON signal is output, and in a case where the shutter button is pushed fully, an S2ON signal is output. In a case where a still image is captured, imaging preparation is performed by pushing the shutter button 114 halfway, and image recording is performed by fully pushing the shutter button. In a case where a moving image is captured, imaging is started by fully pushing the shutter button 114 for the first time, and imaging is ended by fully pushing the shutter button 114 for the second time. The drive button 115 is a button for calling a selection screen of a drive mode. In a case where the drive button 115 is pushed, the selection screen of the drive mode is displayed on the main monitor 104. The drive mode is selected on the selection screen of the drive mode, and single frame imaging, continuous imaging, bracket imaging, multiple exposures, and moving image imaging are selected. The sub monitor illumination button 116 is a button for turning on and off the illumination of the sub monitor 106. The shutter speed dial 117 is a dial for setting the shutter speed. The playback button 118 is a button for instructing switching to the playback mode. In a case where the digital camera 1 is activated in an imaging mode and the playback button 118 is pushed, the digital camera 1 is switched to the playback mode. In a case where the shutter button 114 is pushed in the playback mode, the mode is switched to the imaging mode. Functions corresponding to states of the digital camera 1 are assigned to the front command dial 119 and the rear command dial 120. The focus lever 121 is a lever that selects an AF area. The quick menu button 122 is a button for calling a quick menu. In a case where the quick menu button 122 is pushed, the quick menu is displayed on the main monitor 104. In the quick menu, items registered by a user among items capable of being set in the digital camera 1 are displayed. The menu/OK button 123 is a button for calling a menu screen. In a case where the menu/OK button 123 is pushed, the menu screen is displayed on the main monitor 104. The menu/OK button 123 also functions as a button for confirming a selected item. The selector button 124 is a so-called cross button, and is a button capable of instructing in four directions. In a case where various settings are performed, the selector button 124 is used to select an item. The display/BACK button 125 is a button for switching between display contents of the main monitor 104. The display/BACK button 125 also functions as a button for canceling the selected item, that is, a button for returning to the previous state. Functions selected by the user from among functions prepared in advance are assigned to the first function button 126, the second function button 127, the third function button 128, the fourth function button 129, and the fifth function button 130. For example, a function for manually switching between turned on and off a tracking mode is assigned. In this case, the button to which this function is assigned functions as a tracking mode manual switching unit.

[Electric Configuration]

Figure 3:
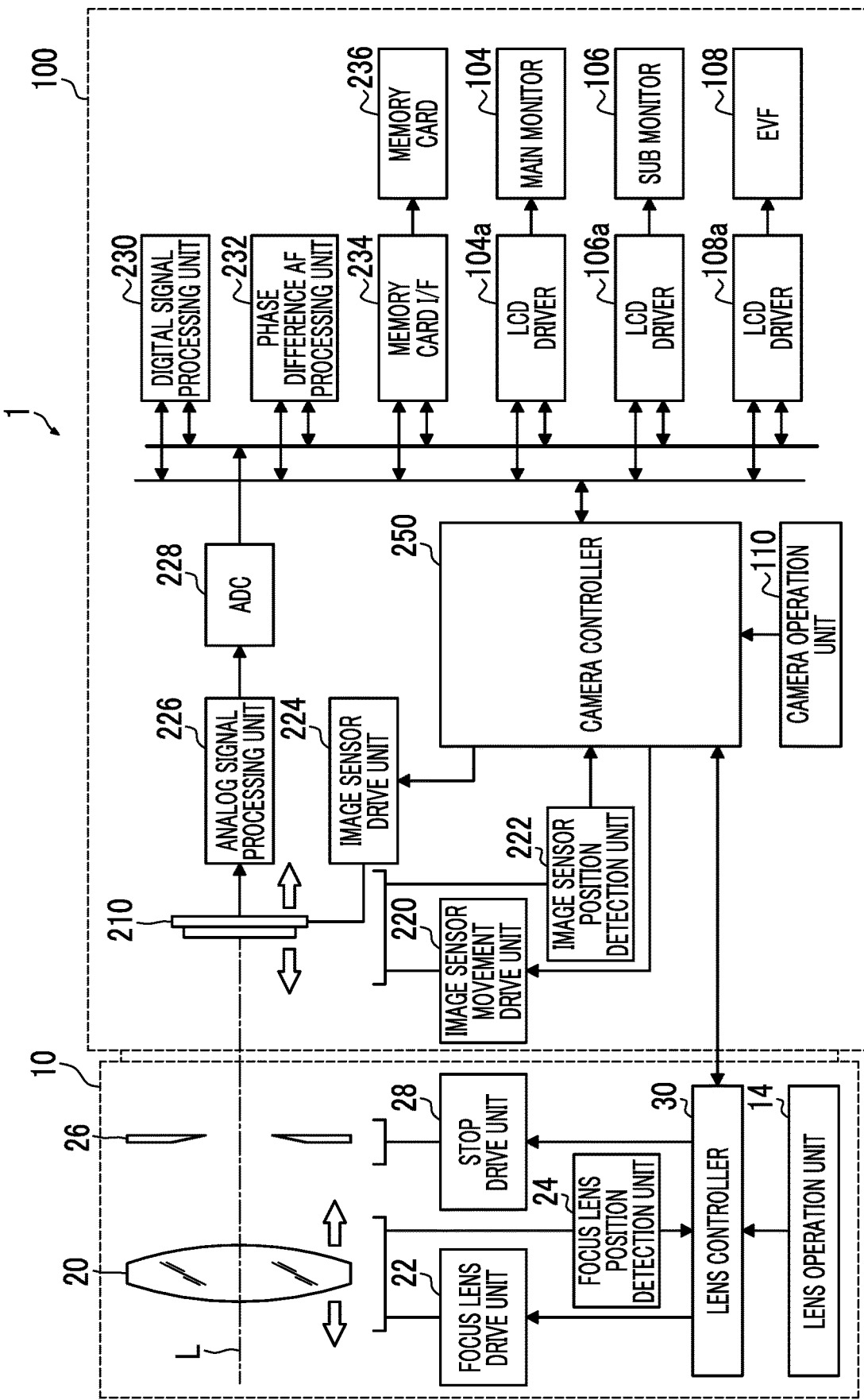
FIG. 3 is a block diagram showing an electric configuration of the digital camera.

FIG. 3 is a block diagram showing an electric configuration of the digital camera.

The interchangeable lens 10 attached to the camera main body 100 is electrically connected to the camera main body 100 via a contact point (not shown) provided on the mount 102.

<<Interchangeable Lens>>

The interchangeable lens 10 comprises a focus lens 20, a focus lens drive unit 22, and a focus lens position detection unit 24, as a focus adjustment mechanism.

The focus lens 20 is a part of a plurality of lenses constituting the interchangeable lens 10. The focus of the interchangeable lens 10 is adjusted by moving the focus lens 20 back and forth along an optical axis L.

The focus lens drive unit 22 moves the focus lens 20 back and forth along the optical axis L. The focus lens drive unit 22 comprises, for example, an actuator such as a linear motor and a drive circuit thereof.

The focus lens position detection unit 24 detects a position of the focus lens 20. The focus lens position detection unit 24 includes, for example, a photo interrupter and a magneto resistive (MR) sensor. The photo interrupter detects that the focus lens 20 is located at a predetermined origin position. The MR sensor detects the amount of movement of the focus lens 20. The MR sensor can detect the position of the focus lens 20 relative to the origin position by detecting that the focus lens 20 is located at the origin position by the photo interrupter and detecting the amount of movement of the focus lens 20 from the origin position by the MR sensor.

The interchangeable lens 10 comprises a stop 26 and a stop drive unit 28, as a light amount adjustment mechanism. The stop 26 is, for example, an iris stop. The stop drive unit 28 comprises a motor that drives stop leaf blades of the stop 26 and a drive circuit thereof.

The interchangeable lens 10 comprises a lens controller 30 that generally controls the overall operation of the interchangeable lens 10. The lens controller 30 is, for example, a microcomputer, and functions as a focus lens drive controller 30a and a stop drive controller 30b by executing a predetermined control program (see FIG. 7).

The focus lens drive controller 30a controls the focus lens drive unit 22 based on an operation signal from the lens operation unit 14, and controls the movement of the focus lens 20. Specifically, the focus lens drive controller controls the focus lens drive unit 22 such that the focus lens 20 moves in a direction and a movement amount corresponding to the operation direction and the operation amount of the focus ring 16. In a case where the focus ring 16 is operated, the lens operation unit 14 outputs an operation signal corresponding to the operation direction and operation amount to the lens controller 30.

The stop drive controller 30b controls the stop 26 by controlling the stop drive unit 28 based on the operation signal from the lens operation unit 14. Specifically, the stop drive controller controls the stop drive unit 28 such that the F number set by the stop ring 18 is obtained. In a case where the stop ring 18 is operated, the lens operation unit 14 outputs the operation signal corresponding to the set F number to the lens controller 30.

In a case where the interchangeable lens 10 is attached to the camera main body 100, the lens controller 30 is connected so as to communicate with the camera controller 250 of the camera main body 100.

<<Camera Main Body>>

The camera main body 100 comprises an image sensor 210, an image sensor movement drive unit 220, an image sensor position detection unit 222, an image sensor drive unit 224, an analog signal processing unit 226, an analog-to-digital converter (ADC) 228, a digital signal processing unit 230, a phase difference AF processing unit 232, a memory card interface 234, a memory card 236, the main monitor 104, the sub monitor 106, the electronic viewfinder (EVF) 108, the camera operation unit 110, and a camera controller 250.

<Image Sensor>

The image sensor 210 images a subject via the interchangeable lens 10. The image sensor 210 includes a solid-state imaging element such as a charged coupled device (CCD) or a complementary metal oxide semiconductor (CMOS). The image sensor 210 has a plurality of phase difference detection pixels on an imaging surface.

Figure 4:
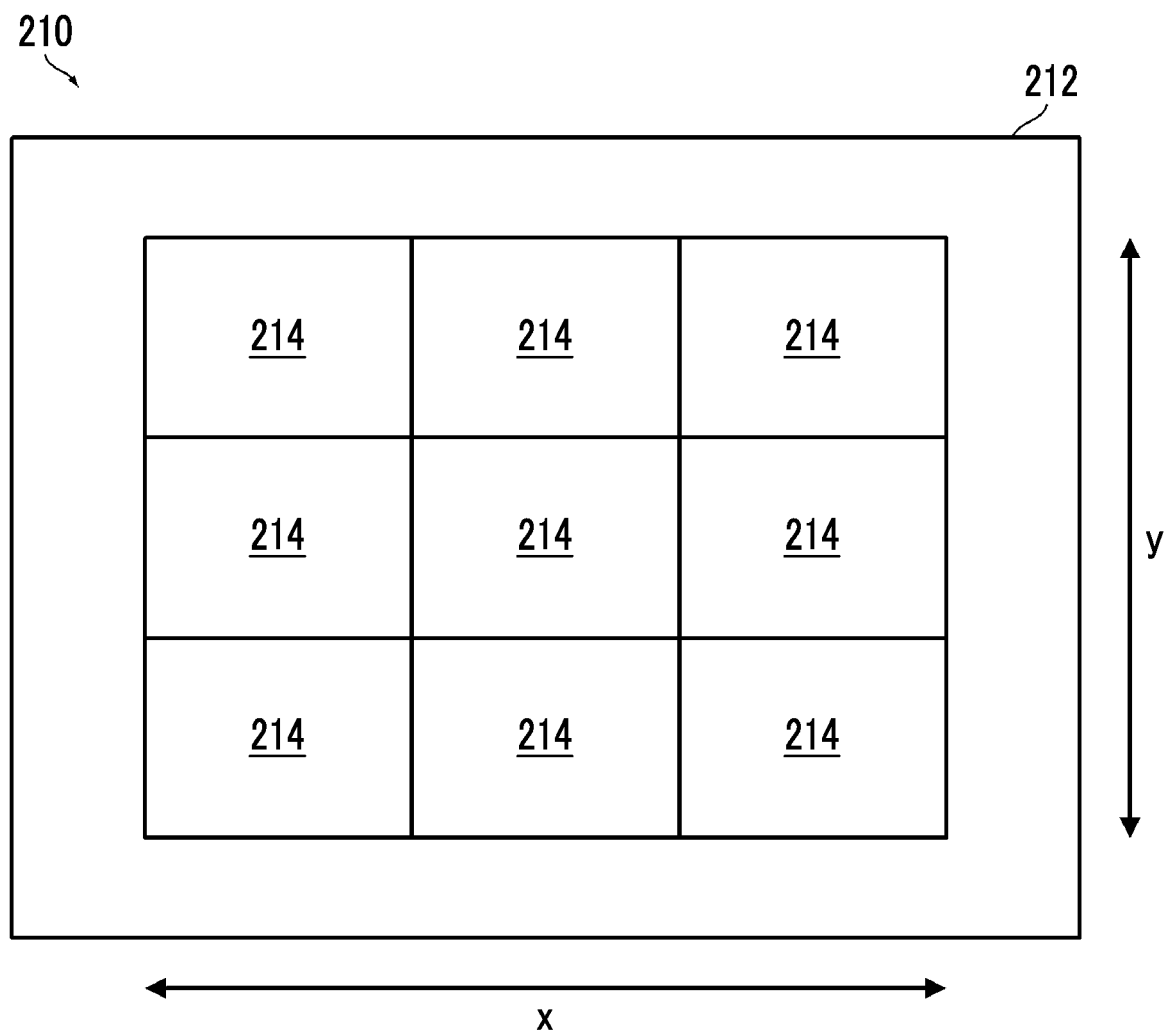
FIG. 4 is a diagram showing a schematic configuration of an image sensor.

FIG. 4 is a diagram showing a schematic configuration of the image sensor.

The image sensor 210 has an imaging surface 212 on which a plurality of pixels is two-dimensionally arranged in an x direction (row direction) and a y direction (column direction). The imaging surface 212 has a plurality of AF (autofocus) areas 214. The AF area 214 is an area set on the imaging surface 212 as an area to be focused. In the example shown in FIG. 4, nine AF areas 214 are set at a central portion of a screen.

Figure 5:
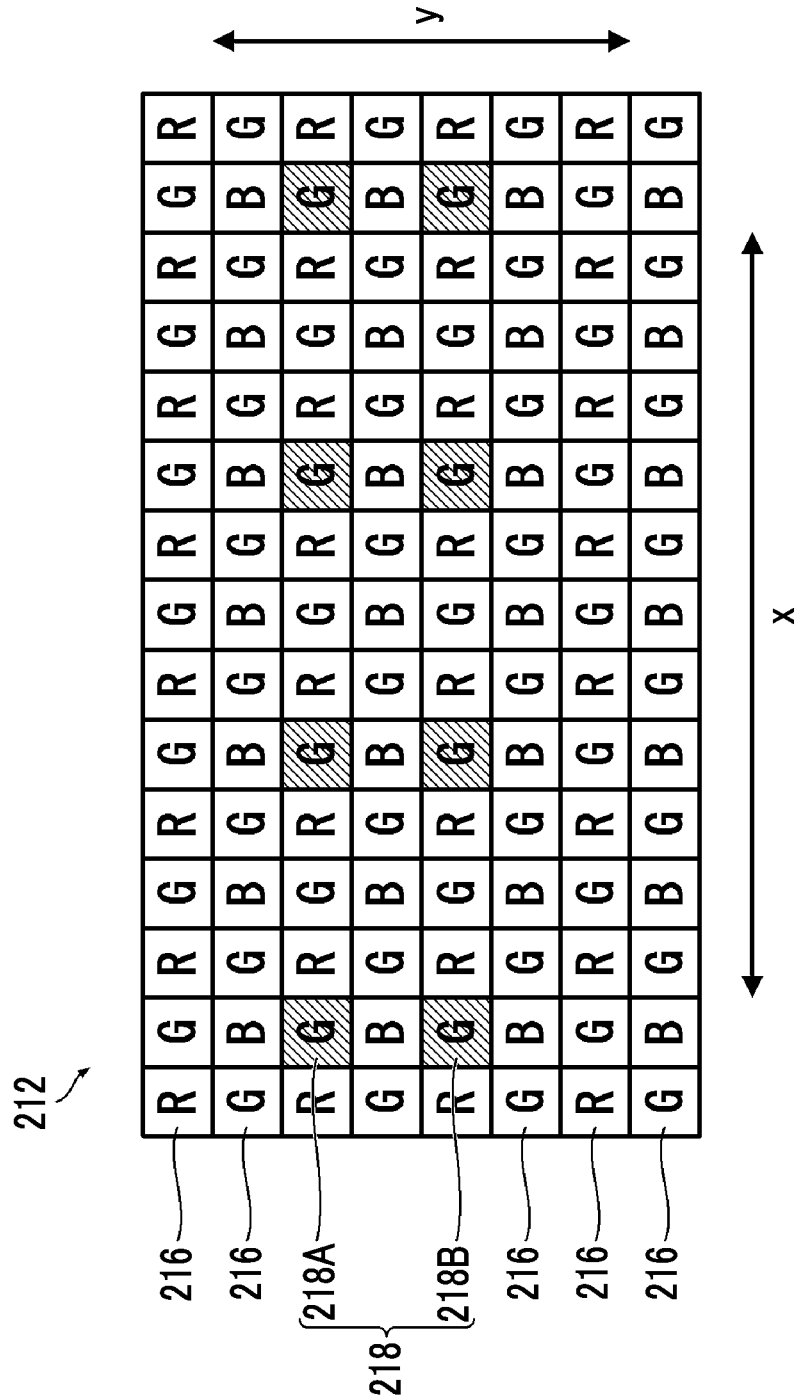
FIG. 5 is an enlarged view of a part of an imaging surface.

FIG. 5 is an enlarged view of a part of the imaging surface.

The plurality of pixels is regularly arranged on the imaging surface 212. Each pixel comprises a photoelectric conversion unit and outputs a signal corresponding to the amount of received light. Each pixel has a color filter of any color of red (R), green (G), and blue (B). The color filters are assigned to the pixels so as to have a predetermined arrangement. FIG. 5 shows an example of a Bayer array. In this diagram, a letter R is given to a pixel (R pixel) having the color filter of R, a letter G is given to a pixel (G pixel) having the color filter of G, and a letter B is given to a pixel (B pixel) having the color filter of B.

Normal pixels 216 and phase difference detection pixels 218 are arranged in the AF area. The normal pixel 216 is a normal imaging pixel. The phase difference detection pixel 218 is a pixel that detects a phase difference. The pixels other than the phase difference detection pixels are the normal pixels. Only the normal pixels are arranged in areas other than the AF areas.

In FIG. 5, the phase difference detection pixels 218 are indicated by diagonal lines. As shown in this diagram, the phase difference detection pixels 218 are regularly arranged on the imaging surface 212.

The phase difference detection pixels 218 include first phase difference detection pixels 218A and second phase difference detection pixels 218B. The first phase difference detection pixels 218A and the second phase difference detection pixels 218B are arranged close to each other. In the example shown in FIG. 5, the first phase difference detection pixels 218A are arranged at regular intervals in one of two rows of the same array adjacent to each other, and the second phase difference detection pixels 218B are arranged at regular intervals on the other row. In particular, an example in which specific G pixels in a specific row in which the R pixels and the G pixels are arranged are used as the phase difference detection pixels is shown.

Figure 6:
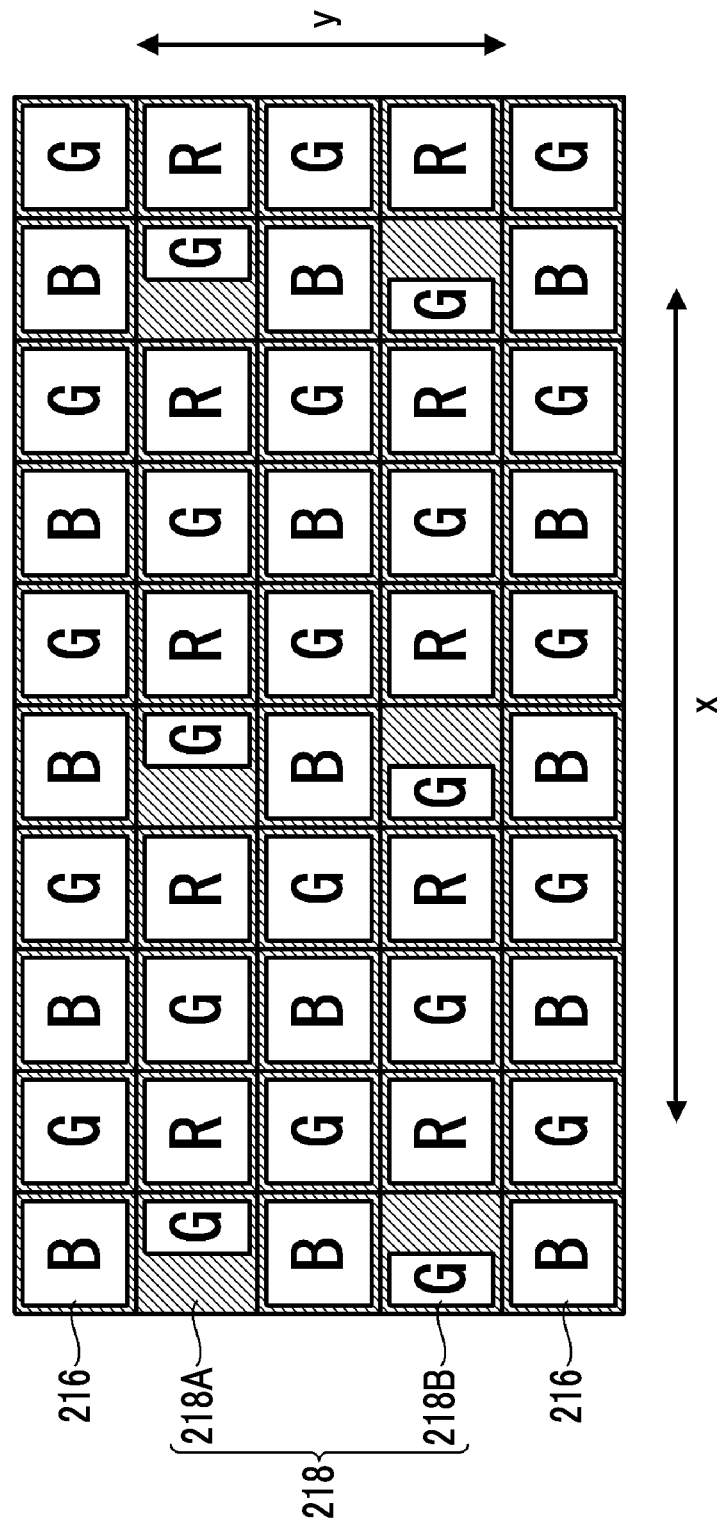
FIG. 6 is a diagram showing a schematic configuration of pixels.

FIG. 6 is a diagram showing a schematic configuration of each pixel.

Each pixel has a light shielding film comprising a predetermined opening portion. In FIG. 6, the opening portion of the light shielding film formed in each pixel is represented in white.

The normal pixel 216 has a light shielding film of which an opening portion coincides with a center of the photoelectric conversion unit. The normal pixel 216 receives light rays passed through almost the entire pupil region of the interchangeable lens 10.

The first phase difference detection pixel 218A has a light shielding film of which an opening portion is eccentric to a right side with respect to the center of the photoelectric conversion unit. As a result, the first phase difference detection pixel 218A receives one of a pair of light rays passed through different portions of the pupil region of the interchangeable lens 10.

The second phase difference detection pixel 218B has a light shielding film of which an opening portion is eccentric to a left side with respect to the center of the photoelectric conversion unit. As a result, the second phase difference detection pixel 218B receives the other of the pair of light rays passed through the different portions of the pupil region of the interchangeable lens 10.

With the aforementioned configuration, it is possible to detect a phase difference amount by acquiring signals of the first phase difference detection pixel 218A and the second phase difference detection pixel 218B and comparing these pixels.

<Image Sensor Movement Drive Unit>

The image sensor movement drive unit 220 moves the image sensor 210 back and forth along the optical axis L. The image sensor movement drive unit 220 comprises, for example, an actuator such as a piezo actuator and a drive circuit thereof.

The image sensor 210 moves within a movable range, and a reference position is set at a center of the movable range. The reference position is set at a flange back position defined by the interchangeable lens 10. In general, the interchangeable lens 10 is optically designed by using the flange back position as a reference. Therefore, the optical performance of the interchangeable lens 10 can be maximized by positioning the image sensor 210 at the reference position.

For example, a flange back of an interchangeable lens employing a C mount is 17.526 mm. A flange back of an interchangeable lens employing a CS mount is 12.5 mm.

<Image Sensor Position Detection Unit>

The image sensor position detection unit 222 detects the position of the image sensor 210 relative to the reference position. The image sensor position detection unit 222 includes, for example, a displacement sensor such as an eddy current sensor.

<Image Sensor Drive Unit>

The image sensor drive unit 224 drives the image sensor 210 under the control of the camera controller 250. The image sensor 210 is driven by the image sensor drive unit 224 to image an image.

<Analog Signal Processing Unit>

The analog signal processing unit 226 acquires an analog image signal for each pixel output from the image sensor 210, and performs predetermined signal processing (for example, sampling two correlation pile and amplification processing).

<ADC>

The ADC 228 converts the analog image signals output from the analog signal processing unit 226 into digital image signals, and outputs the digital image signals.

<Digital Signal Processing Unit>

The digital signal processing unit 230 acquires the digital image signals, and generates image data by performing predetermined signal processing (for example, gradation transformation processing, white balance correction processing, gamma-correction processing, demosaicing processing, and YC conversion processing).

<Phase Difference AF Processing Unit>

The phase difference autofocus (AF) processing unit 232 is an example of a focus detection unit. The phase difference AF processing unit 232 acquires the signals of the first phase difference detection pixels 218A and the second phase difference detection pixels 218B from the designated AF area 214, and calculates the phase difference amount by performing correlation calculation processing on the acquired signals. A defocus direction and amount are calculated based on the calculated phase difference amount. The AF area is selected by the user. Alternatively, the AF area is automatically decided. The selection of the user is performed by operating the focus lever 121. In a case where the AF area is automatically decided, for example, the subject is automatically recognized, and the AF area where the subject is present is selected. Alternatively, a moving object is recognized, and an AF area where the moving object is present is selected.

<Memory Card Interface and Memory Card>

The memory card interface 234 reads and writes data from and in the memory card 236 attached to a card slot under the control of the camera controller 250.

<Main Monitor>

The main monitor 104 includes an LCD. The display on the main monitor 104 is controlled by the camera controller 250. The camera controller 250 controls the display on the main monitor 104 via an LCD driver 104a.

<Sub Monitor>

The sub monitor 106 includes an LCD. The display on the sub monitor 106 is controlled by the camera controller 250. The camera controller 250 controls the display on the sub monitor 106 via an LCD driver 106a.

<Electronic Viewfinder>

The display unit of the electronic viewfinder (EVF) 108 is an LCD. The display on the electronic viewfinder 108 is controlled by the camera controller 250. The camera controller 250 controls the display on the electronic viewfinder 108 via an LCD driver 108a.

<Camera Operation Unit>

The camera operation unit 110 outputs a signal corresponding to the operation of each operation member to the camera controller 250.

<Camera Controller>

The camera controller 250 is a controller that generally controls the entire operation of the digital camera 1. The camera controller 250 includes, for example, a microcomputer, and provides various functions by executing predetermined programs.

Figure 7:
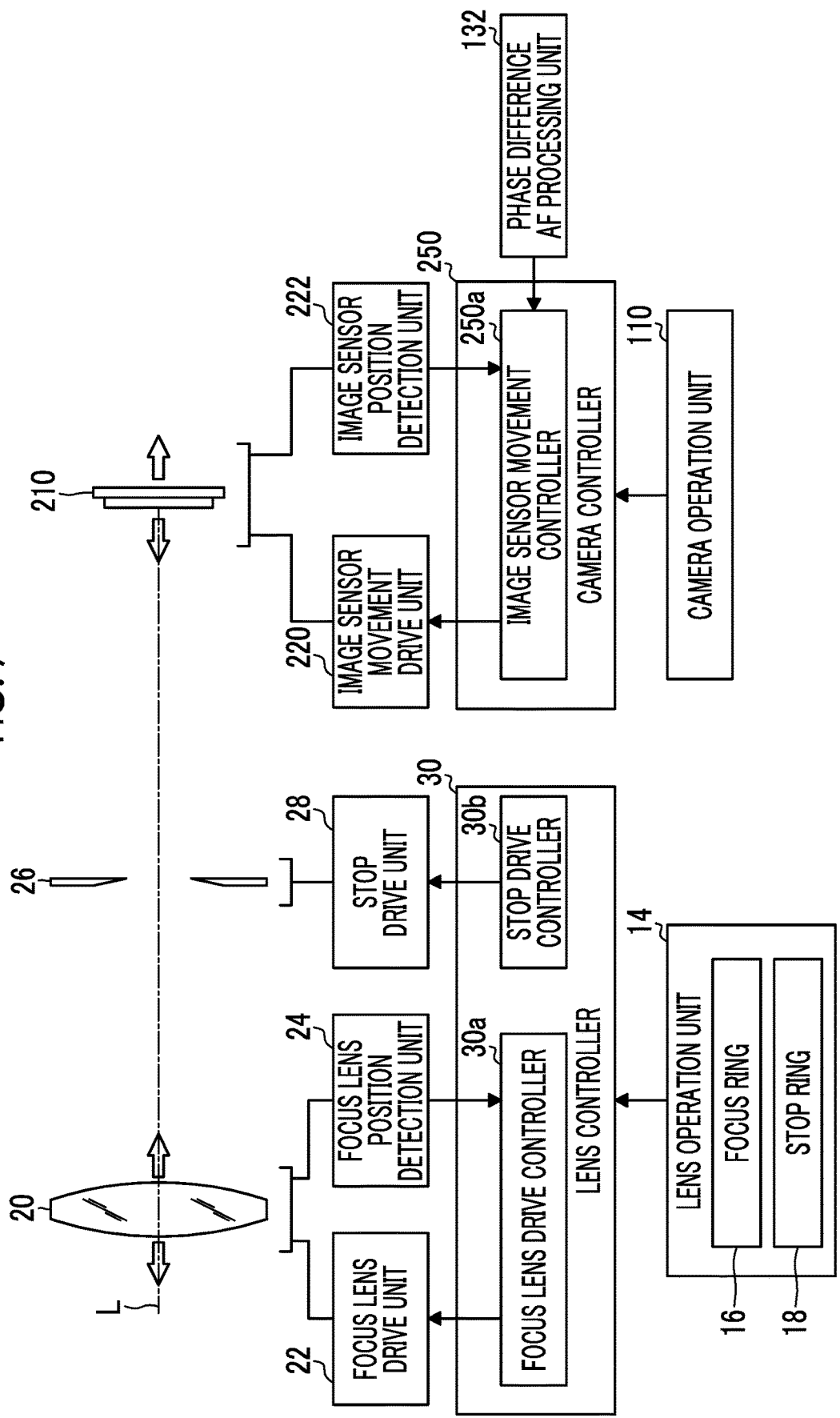
FIG. 7 is a block diagram of functions realized by a camera controller and a lens controller.

FIG. 7 is a block diagram of functions realized by the camera controller and the lens controller.

As shown in FIG. 7, the camera controller 250 functions as an image sensor movement controller 250a by executing a predetermined program.

The image sensor movement controller 250a controls the movement of the image sensor 210 to track the subject based on a defocus amount detected by the phase difference AF processing unit 232. The tracking is performed by controlling the movement of the image sensor 210 so as to maintain a focusing state.

Here, AF based on the movement of the image sensor 210 will be described.

FIGS. 8A and 8B are conceptual diagrams a case where the focusing is performed based on the movement of the image sensor. FIG. 8A shows a state in a case where the focus is shifted, and FIG. 8B shows the focusing state.

As shown in FIG. 8A, it is assumed that the image sensor 210 is located at a reference position R0 and an image of a subject A at a position P1 is formed at a position R1. As shown in FIG. 8A, it is assumed that the position R1 is behind (image plane side) from the reference position R0. In this case, the image sensor 210 is moved backward, and is located at the position R1 as shown in FIG. 8B. Accordingly, the image of the subject A is formed on the imaging surface, and is focused.

In this manner, the subject can be focused by moving the image sensor 210 to a position at which the image of the subject is formed, that is, a position of an image formation point. In order to maintain the focusing state, the image sensor 210 may be moved so as to follow the movement of the image formation point. Therefore, the tracking is performed by moving the image sensor 210 so as to follow the movement of the image formation point. A shift amount between the position of the image formation point and the position of the imaging surface is detected as the defocus amount. Therefore, the image sensor movement controller 250a controls the movement of the image sensor 210 to maintain the focusing state based on the defocus amount.

FIGS. 9A and 9B are conceptual diagrams of tracking control based on the movement of the image sensor.

FIG. 9A shows a case where the subject A moves from the position P1 to a position P2, and a position R2 of the image formation point reaches an end portion of a movable range W of the image sensor 210. The image sensor movement controller 250a performs the tracking until the image sensor 210 reaches the end portion of the movable range W. That is, the image sensor movement controller controls the movement of the image sensor 210 to maintain the focusing state based on the defocus amount.

FIG. 9B shows a case where the subject A further moves from the position P2 to a position P3 and a position R3 of the image formation point moves beyond the end portion of the movable range W of the image sensor 210. In a case where the image sensor 210 reaches the end portion of the movable range W, the subsequent tracking is unable. In a case where the image sensor 210 reaches the end portion of the movable range W, the image sensor movement controller 250a ends the tracking. In a case where the tracking is ended, the image sensor movement controller 250a returns the image sensor 210 to the reference position R0.

In a case where the image sensor 210 is returned to the reference position R0, the image sensor movement controller 250a moves the image sensor 210 at a moving speed corresponding to a change of the defocus amount. In a case where the image sensor 210 is returned to the reference position R0, since the focus state is changed, there is a concern that an unnatural image will be formed. However, the image sensor 210 can be returned to the reference position R0 without giving an uncomfortable feeling to the image by moving the image sensor 210 at the moving speed corresponding to the change of the defocus amount. Here, the image sensor 210 is returned to the reference position R0 by moving the image sensor 210 at the approximately same speed (the same speed or a substantially same speed) as a speed at which the defocus amount is changed. That is, the image sensor 210 is returned to the reference position R0 by moving the image sensor 210 at the same speed as the moving speed of the image formation point.

Figure 10:
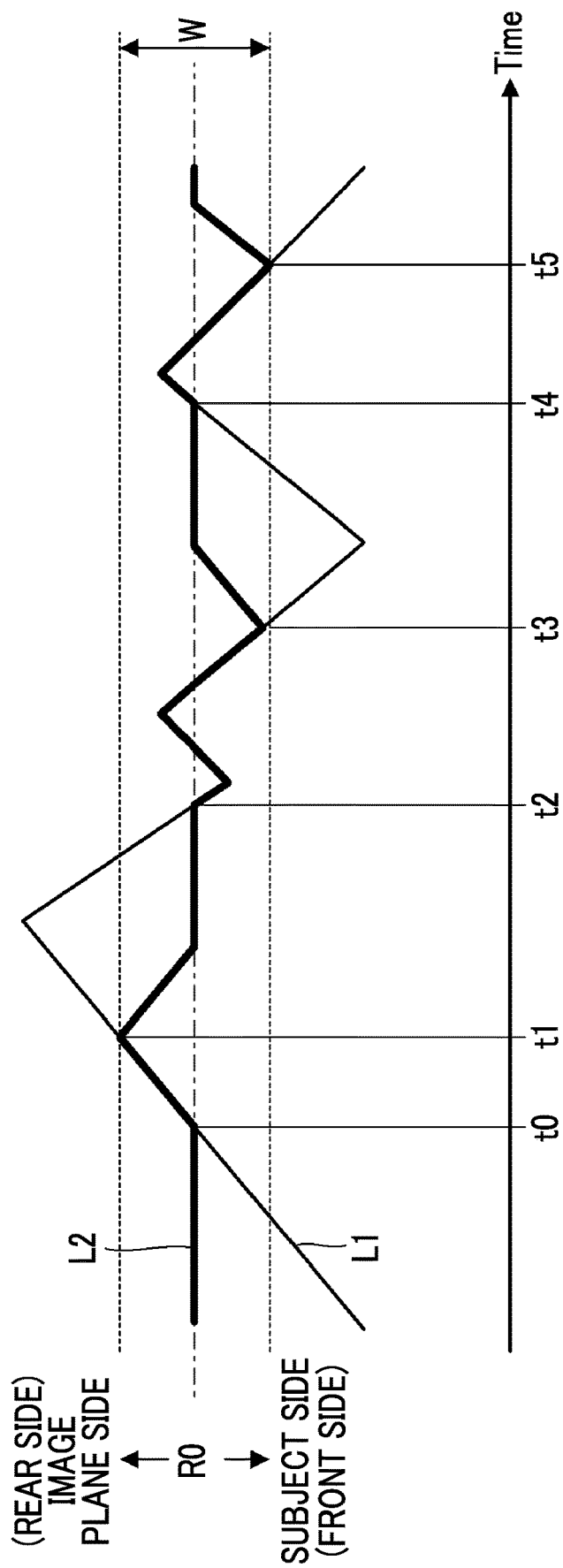
FIG. 10 is a conceptual diagram of the tracking control over time.

FIG. 10 is a conceptual diagram of tracking control over time.

In this diagram, a reference L1 denotes a movement locus of the image formation point, and a reference L2 denotes a movement locus of the image sensor 210.

As shown in this diagram, in a case where the focusing is performed, the tracking is started. That is, the tracking is started in a case where the image formation point is located on the imaging surface of the image sensor 210 located at the reference position R0. In a case where the image formation point is located on the imaging surface of the image sensor 210, the defocus amount becomes zero. Therefore, the tracking is started in a case where the defocus amount becomes zero.

In the example shown in FIG. 10, the focusing is initially performed at timing t0. Therefore, the tracking is started from timing t0. As shown in FIG. 10, the movement of the image sensor 210 is started after the focusing is performed at timing t0. The image sensor 210 moves following the movement of the image formation point. Accordingly, the focusing state is maintained.

The image sensor 210 moves within the movable range. In the example shown in FIG. 10, the image sensor 210 reaches the end portion of the movable range W at timing t1 after the focusing is performed at timing t0. In this case, the tracking is temporarily ended. When the tracking is ended, the image sensor 210 is returned to the reference position R0. At this time, the image sensor is returned to the reference position R0 by moving at the substantially same speed as the moving speed of the image formation point.

In a case where the image sensor is returned to the reference position R0, the image sensor 210 stands by at the reference position R0 until the focusing is performed again. The example shown in FIG. 10 shows a case where the focusing is performed again at timing t2. In this case, the tracking is resumed from timing t2. In the example shown in FIG. 10, the image sensor 210 reaches the end portion of the movable range W at timing t3, and after the focusing is performed again at timing t4, the image sensor 210 reaches the end portion of the movable range W at timing t5. As shown in this diagram, the tracking is ended whenever the image sensor 210 reaches the end portion of the movable range W. In a case where the tracking is ended, the image sensor 210 is returned to the reference position R0. In a case where the image sensor 210 is returned to the reference position R0, the image sensor stands by until the focusing is performed again, and in a case where the focusing is performed, the tracking is resumed.

As described above, in a case where the focusing is performed, the image sensor movement controller 250a starts the tracking, moves the image sensor 210 within the movable range, and maintains the focusing state. Meanwhile, in a case where the image sensor 210 reaches the end portion of the movable range W, the tracking is ended, the image sensor 210 is returned to the reference position R0, and stands by until the focusing is performed again.

[Actions]

The tracking control is performed in a case where the tracking mode is turned on. In a case where the function for manually switching the turned-on and turned-off the tracking mode is assigned to the function button, the tracking mode can be turned on and off by operating the function button. The tracking mode can be switched between the turned-on and turned-off on the menu screen.

Figure 11:
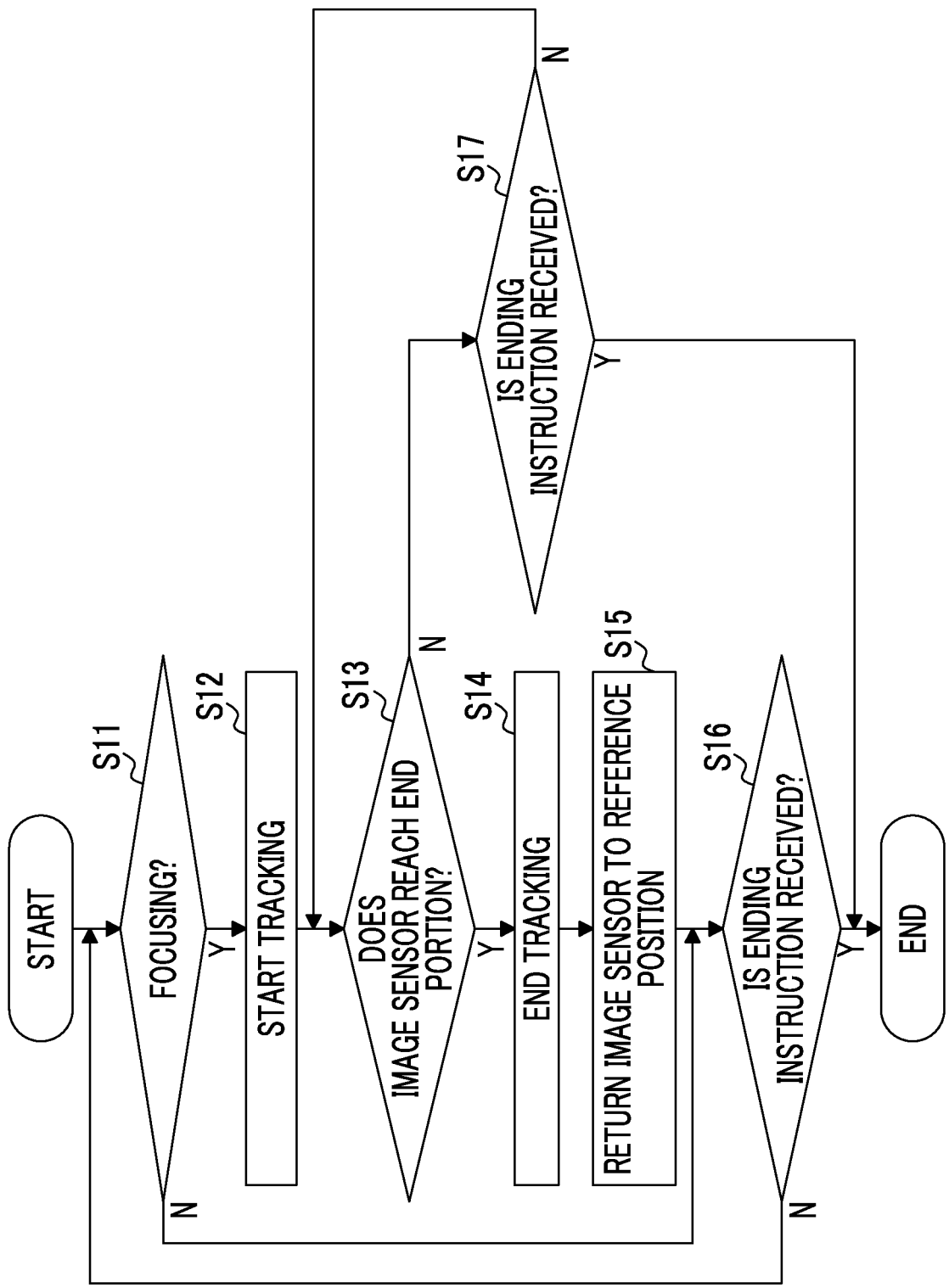

FIG. 11 is a flowchart showing a processing procedure (focusing control method) of the tracking control in a case where the tracking mode is turned on.

A photographer manually adjusts the focus by operating the focus ring 16. The image sensor movement controller 250a determines whether or not the focusing is performed based on an output of the phase difference AF processing unit 232 (step S11).

In a case where it is determined that the focusing is performed, the image sensor movement controller 250a starts the tracking (step S12). That is, the image sensor movement controller controls the movement of the image sensor 210 to maintain the focusing state based on the defocus amount detected by the phase difference AF processing unit 232.

The tracking control is performed within the movable range of the image sensor 210. In a case where the image sensor 210 reaches the end portion of the movable range, the tracking is ended. The image sensor movement controller 250*a* determines whether or not the image sensor 210 reaches the end portion of the movable range (step S13).

In a case where it is determined that the image sensor 210 does not reach the end portion of the movable range, the image sensor movement controller 250*a* determines whether an instruction to end the tracking is received (step S17). The ending of the tracking is instructed in a case where the tracking mode is turned off. In a case where the power of the digital camera 1 is turned off, the ending is similarly instructed. In a case where the ending is instructed, the processing is ended. Unless the ending is instructed, the tracking is continued.

Meanwhile, when it is determined that the image sensor 210 reaches the end portion of the movable range, the image sensor movement controller 250*a* ends the tracking (step S14). After the tracking is ended, the image sensor movement controller 250*a* returns the image sensor 210 to the reference position R0 (step S15).

Thereafter, the image sensor movement controller 250*a* determines whether or not the instruction to end the tracking is received (step S16). In a case where the ending is instructed, the processing is ended. Meanwhile, in a case where it is determined that the ending instruction is not received, the processing returns to step S11, and it is determined whether or not the focusing is performed. In a case where the focusing is performed, the tracking is resumed.

As described above, in the digital camera 1 of the present embodiment, in a case where the focusing is performed, the tracking is started, and the movement of the image sensor 210 is controlled so as to maintain the focusing state. Accordingly, the user can be properly supported and can perform the focusing with high accuracy at the time of performing manual focusing. In particular, it is possible to perform the focusing of a moving subject with high accuracy.

In a case where the tracking is unable, the image sensor 210 is returned to the reference position R0. Accordingly, it is possible to improve followability at the time of resuming the tracking. At the time of returning the image sensor 210 to the reference position R0, the image sensor is returned to the reference position R0 by moving the image sensor 210 at a moving speed corresponding to the change of the defocus amount. Accordingly, the image sensor 210 can be returned to the reference position R0 without giving an uncomfortable feeling to the image.

♦♦Second Embodiment♦♦

In the digital camera of the aforementioned embodiment, in a case where the image sensor 210 reaches the end portion of the movable range W, the tracking is ended, and the image sensor 210 is returned to the reference position R0.

In the digital camera according to the present embodiment, in a case where the image sensor 210 reaches the end portion of the movable range W, the tracking is ended, and the image sensor 210 stands by at the position of the end portion until the focusing is performed again. In a case where the focusing is performed again during standby, the tracking is resumed.

Since the configuration of the camera is the same as that of the first embodiment, only the processing contents of the tracking control will be described below.

Figure 12:
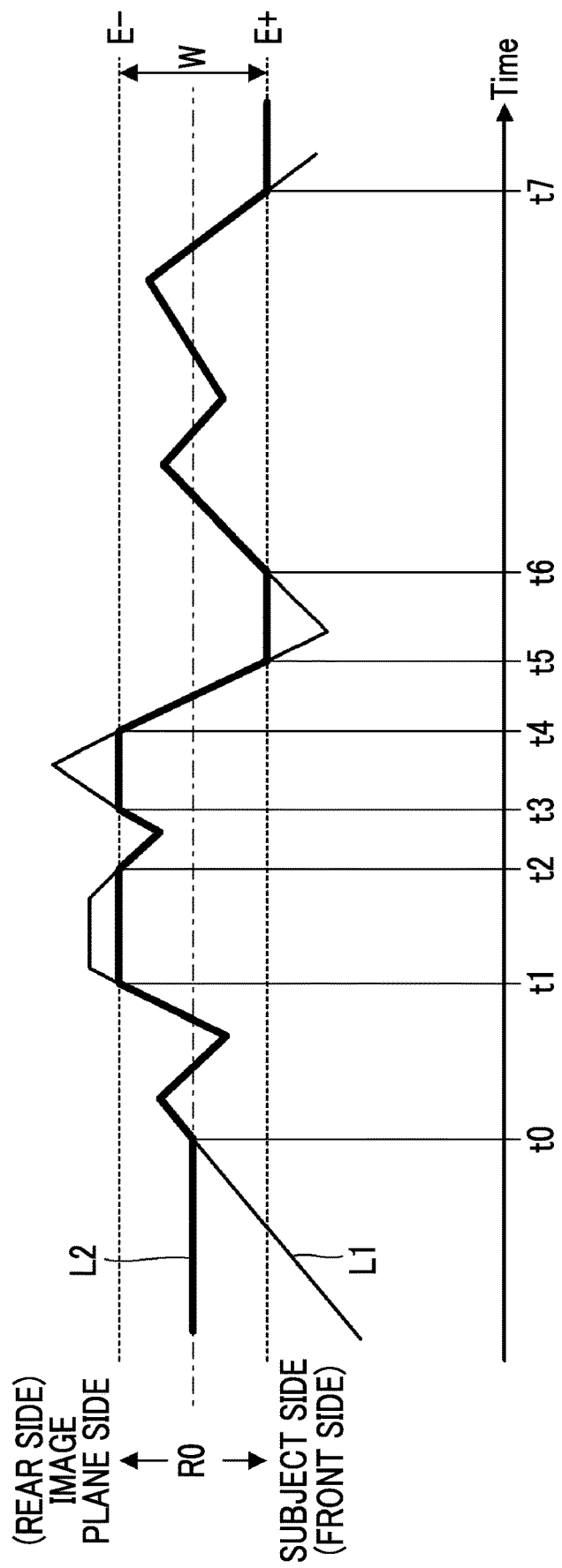
FIG. 12 is a conceptual diagram of the tracking control over time.

FIG. 12 is a conceptual diagram of the tracking control over time in the digital camera of the present embodiment.

In this diagram, a reference L1 denotes a movement locus of the image formation point, and a reference L2 denotes a movement locus of the image sensor 210.

As shown in this diagram, in a case where the focusing is performed, the tracking is started. That is, the tracking is started in a case where the image formation point is located on the imaging surface of the image sensor 210 located at the reference position R0.

In the example shown in FIG. 12, the focusing is performed for the first time at timing t0. Therefore, the tracking is started from timing t0. As shown in FIG. 12, the movement of the image sensor 210 is started after the focusing is performed at timing t0. The image sensor 210 moves following the movement of the image formation point. Accordingly, the focusing state is maintained.

The image sensor 210 moves within the movable range. The example shown in FIG. 12 shows a case where the image sensor 210 reaches one end portion E− of the movable range W at timing t1 after the focusing is performed at timing t0. In this case, the tracking is temporarily ended. In a case where the tracking is ended, the image sensor 210 is stopped at a position of the end portion E−, and stands by until the focusing is performed again.

In the example shown in FIG. 12, a case where the focusing is performed again at timing t2 is shown. In this case, the tracking is resumed from timing t2. In the example shown in FIG. 12, the image sensor 210 reaches one end portion E− of the movable range W at timing t3, and after the focusing is performed again at timing t4, the image sensor 210 reaches to the other end portion E+ of the movable range W at timing t5. A case where the image sensor 210 reaches the other end portion E+ of the movable range W at timing t7 after the focusing is performed again at timing t6 is shown. As shown in this diagram, the tracking is ended whenever the image sensor 210 reaches the end portion of the movable range W. In a case where the tracking is ended, the image sensor 210 is stopped at the position of the end portion, and stands by until the focusing is performed again. IN a case where the focusing is performed again, the tracking is resumed.

As described above, in a case where the focusing is performed, the image sensor movement controller 250*a* starts the tracking, moves the image sensor 210 within the movable range, and maintains the focusing state. Meanwhile, in a case where the image sensor 210 reaches the end portion of the movable range W, the tracking is ended, and the image sensor stands by at the position of the end portion until the focusing is performed again.

[Actions]

Figure 13:
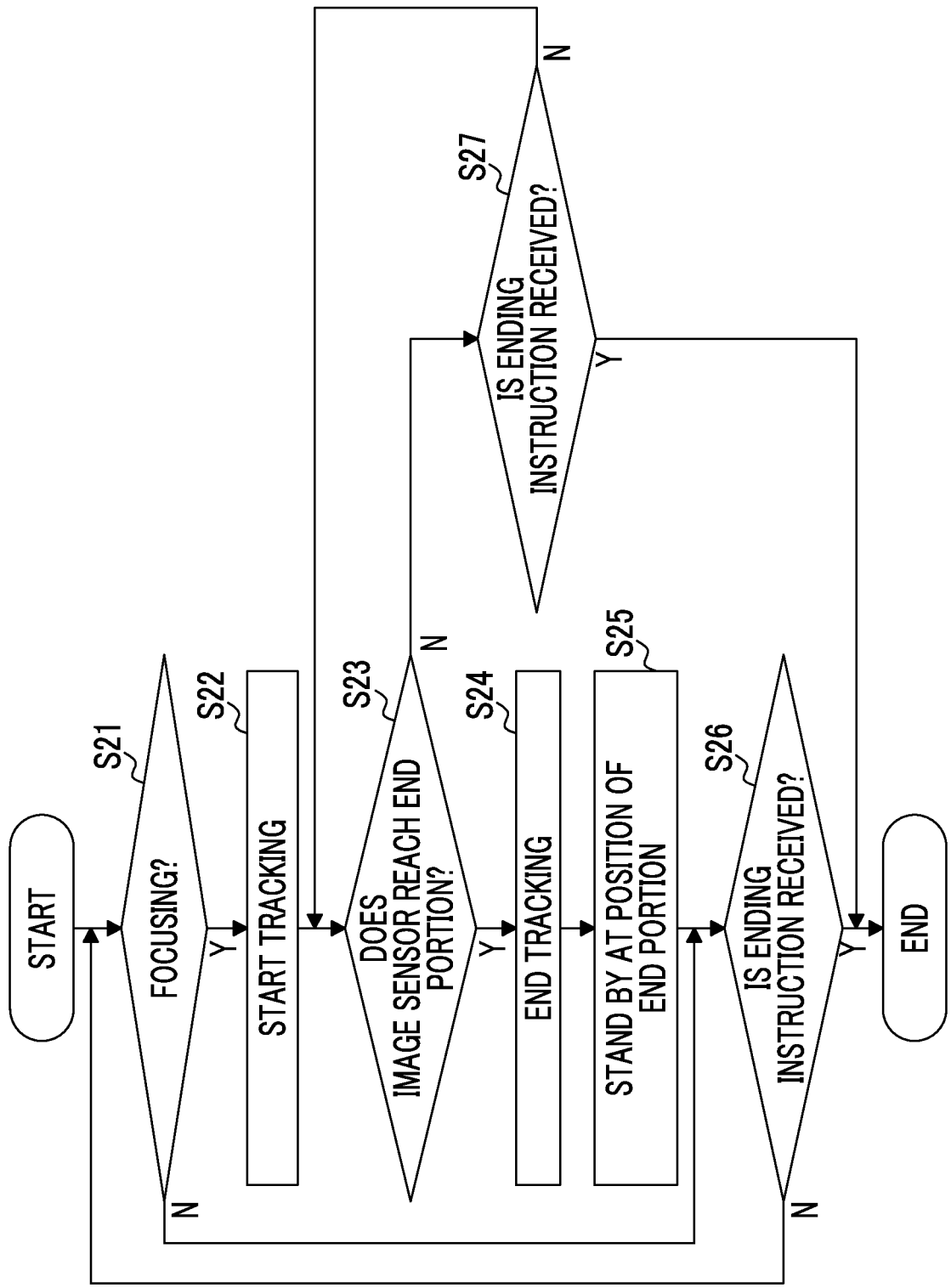

FIG. 13 is a flowchart showing a processing procedure (focusing control method) of the tracking control in a case where the tracking mode is turned on.

The photographer manually adjusts the focus by operating the focus ring 16. The image sensor movement controller 250*a* determines whether the focusing is performed based on the output of the phase difference AF processing unit 232 (step S21).

In a case where the image sensor movement controller 250*a* determines that the focusing is performed, the tracking is started (step S22). That is, the image sensor movement controller controls the movement of the image sensor 210 to maintain the focusing state based on the defocus amount detected by the phase difference AF processing unit 232.

The tracking is performed within the movable range of the image sensor 210. In a case where the image sensor 210 reaches the end portion of the movable range, the tracking is ended. The image sensor movement controller 250*a* determines whether or not the image sensor 210 reaches the end portion of the movable range (step S23).

In a case where it is determined that the image sensor 210 does not reach the end portion of the movable range, the image sensor movement controller 250a determines whether an instruction to end the tracking is received (step S27). In a case where the ending is instructed, the processing is ended. Unless the ending is instructed, the tracking is continued.

Meanwhile, when it is determined that the image sensor 210 reaches the end portion of the movable range, the image sensor movement controller 250a ends the tracking (step S24). After the tracking is ended, the image sensor movement controller 250a causes the image sensor 210 to stand by at the position of the end portion (step S25).

Thereafter, the image sensor movement controller 250a determines whether or not the instruction to end the tracking is received (step S26). In a case where the ending is instructed, the processing is ended. Meanwhile, in a case where it is determined that the ending instruction is not received, the processing returns to step S21, and it is determined whether or not the focusing is performed. In a case where the focusing is performed, the tracking is resumed.

As described above, in the digital camera 1 of the present embodiment, in a case where the focusing is performed, the tracking is started, and the movement of the image sensor 210 is controlled so as to maintain the focusing state. Accordingly, the user can be properly supported and can perform the focusing with high accuracy at the time of performing manual focus adjustment. In particular, the focusing of the moving subject can be performed with high accuracy.

In a case where the tracking is unable, the image sensor 210 is stopped and stands by at the position of the end portion of the movable range W. Accordingly, it is possible to easily recover the focusing state. That is, since a distance to return to the focusing state can be shortened, the focusing state can be quickly recovered.

◆◆Other Embodiments◆◆

[Focusing Determination]

In the aforementioned embodiment, the tracking is started in a case where the subject is focused. In addition to this, the tracking may be started by considering that the focusing is performed in a case where the defocus amount detected by the phase difference AF processing unit 232 is continuously equal to or less than a threshold value for a predetermined time.

In a case where the focus is adjusted by using the main monitor 104 or the electronic viewfinder 108 and the resolution of the main monitor 104 and the electronic viewfinder 108 is low, it is difficult to accurately perform the focusing while viewing the image on the main monitor 104 or the electronic viewfinder 108.

Therefore, in a case where the defocus amount detected by the phase difference AF processing unit 232 is continuously equal to or less than the threshold value for the predetermined time, since it is recognized that the state is almost substantially close to the focusing, the tracking is started by considering that the focusing is performed. In a case where the defocus amount is continuously equal to or less than the threshold value for the predetermined time, the tracking is started by considering that the focusing is performed in this case.

Figure 14:
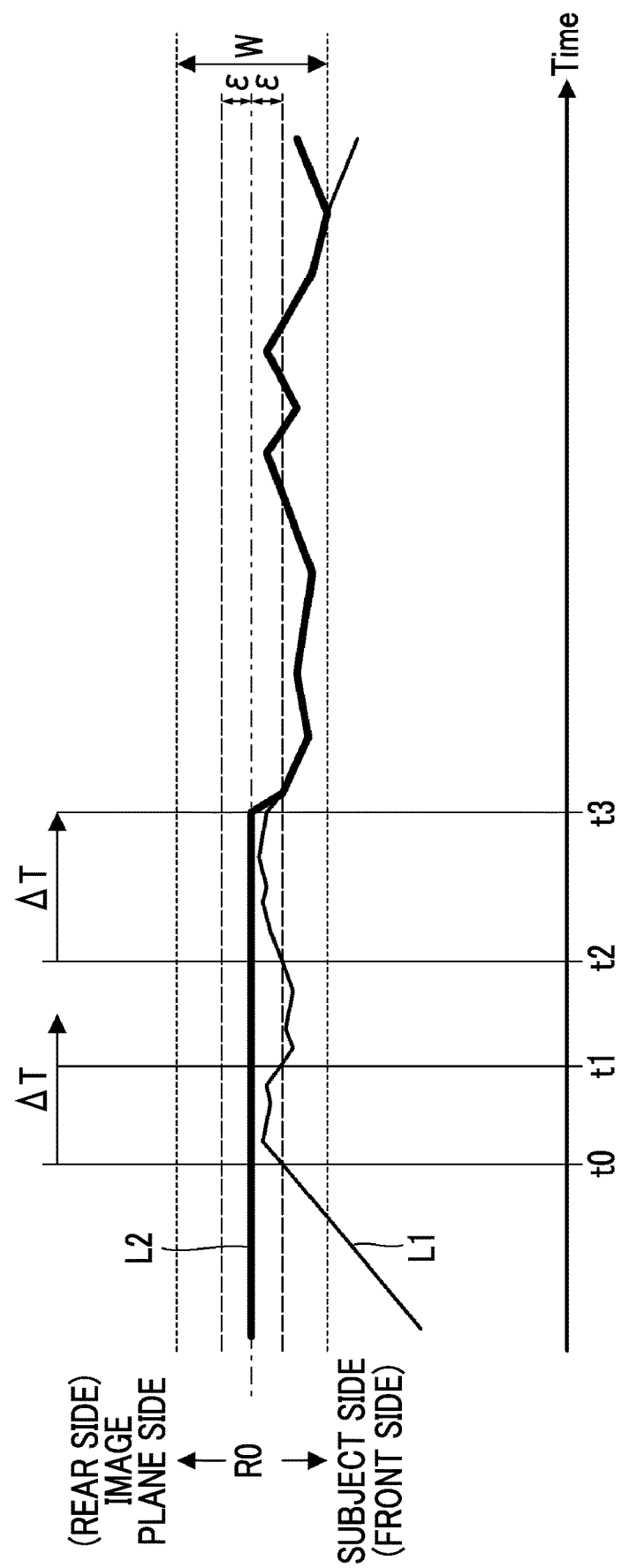
FIG. 14 is a conceptual diagram of processing over time in a case where the tracking is performed by considering that the focusing is performed in a case where a defocus amount is continuously equal to or less than a threshold value for a predetermined time.

FIG. 14 is a conceptual diagram of processing over time in a case where the tracking is performed by considering that the focusing is performed in a case where the defocus amount is continuously equal to or less than the threshold value for the predetermined time.

In this diagram, a reference L1 denotes a movement locus of the image formation point, and a reference L2 denotes a movement locus of the image sensor 210.

A threshold value of the defocus amount is $\varepsilon$. The tracking is started by considering that the focusing is performed in a case where a state in which the defocus amount is equal to or less than the threshold value $\varepsilon$ is continued for time $\Delta T$.

In the example shown in FIG. 14, the defocus amount is initially equal to or less than the threshold value $\varepsilon$ at timing t0. However, the defocus amount exceeds the threshold value $\varepsilon$ at timing t1 before time $\Delta T$ elapses. Thus, even though the defocus amount is equal to or less than the threshold value $\varepsilon$, it is not considered that the focusing is performed.

In the example shown in FIG. 14, the defocus amount is equal to or less than the threshold value $\varepsilon$ again at timing t2. After timing t2, the defocus amount is continuously equal to or less than the threshold value $\varepsilon$. Thus, the tracking is started at timing t3 at which time $\Delta T$ elapses.

In a case where the tracking is started, the image sensor 210 moves toward the image formation point, and the focusing is performed. After the focusing is performed, the image sensor 210 moves within the movable range, and the focusing state is maintained.

In this manner, the tracking is started by considering that the focusing is performed in a case where the defocus amount is continuously equal to or less than the threshold value for the predetermined time. Accordingly, it is possible to improve convenience. In particular, in a case where the focus is adjusted by using the main monitor 104 or the electronic viewfinder 108 having a low resolution (resolution), it may be difficult to accurately perform the focusing. Even in such a case, in a case where the focusing is performed in the vicinity of the focusing, since the tracking is performed, the intention of the photographer can be appropriately reflected on the control.

In addition to the aforementioned conditions, the tracking may be started by considering that the focusing is performed in a case where the amount of change of the defocus amount detected by the phase difference AF processing unit 232 is continuously equal to or less than a threshold value for a predetermined time. That is, the tracking may be started by considering that the focusing is performed in a case where the defocus amount detected by the phase difference AF processing unit 232 is continuously equal to or less than a first threshold value for a predetermined time and the amount of change amount in defocus amount detected by the phase difference AF processing unit 232 is continuously equal to or less than a second threshold value for a predetermined time. The state in which the defocus amount is continuously equal to or less than the predetermined value (equal to or less than the first threshold value) for the predetermined time and the amount of change of the defocus amount is continuously equal to or less than the predetermined value (equal to or less than the second threshold value) for the predetermined time is a state in which the focus lens is almost not changed in the vicinity of the focusing. That is, the focus adjustment is almost not performed in the vicinity of the focusing. In this case, the tracking is started by considering that the focusing is performed. Accordingly, the tracking can be started from a state almost substantially close to the focusing. Accordingly, it is possible to improve convenience.

The function may be turned on and off by the user. That is, a function of turning on and off the function considered as the focusing by the user may be provided. For example, the turning on and off of the function are set on the menu screen.

[Automatic Switching of Tracking Mode]

Although it has been described in the aforementioned embodiment that the tracking mode is manually switched between the turned-on and turned-off, the tracking mode may be automatically switched. For example, in a case where the focusing is continuously performed for a predetermined time, a function of automatically turning on the tracking mode may be provided. In this case, the camera controller 250 functions as a tracking mode automatic switching unit. The tracking mode automatic switching unit determines whether or not the focusing is continuously performed for the predetermined time based on the output of the phase difference AF processing unit 232, and automatically switches the tracking mode. That is, in a case where it is determined that the focusing state is continuously performed for the predetermined time, the tracking mode is automatically turned on. Accordingly, in a case where the photographer continues to focus on a specific subject, the tracking mode can be automatically set. Therefore, the intention of the photographer can be reflected on the control, and the convenience can be further improved.

It is preferable that the user optionally turns on and off the function. That is, it is preferable that a function of allowing the user to optionally turn on and off the function of automatically turning on the tracking mode is provided. For example, the turning on and off of the function is set on the menu screen. it is preferable that the tracking mode that is automatically turned on is turned off in a case where the function is turned off.

In a case where the camera main body 100 cannot communicate with the interchangeable lens 10, the tracking mode may be automatically turned on. The case where the camera main body 100 cannot communicate with the interchangeable lens 10 is a case where the camera controller 250 cannot communicate with the lens controller 30, and corresponds to a case where the lens controller 30 is not provided in the interchangeable lens 10.

[Movable Range of Image Sensor]

The movable range of the image sensor 210 is optionally set within a mechanical operation range of the image sensor movement drive unit 220. For example, in a case where the image sensor movement drive unit 220 is a piezo actuator, the movable range of the image sensor 210 is optionally set within the mechanical operation range of the piezo actuator. As the movable range becomes wider, an operation range of the AF becomes wider.

As in the digital camera of the aforementioned embodiment, in a case where the focus is adjusted by using the main monitor 104 or the electronic viewfinder 108, it is preferable that the movable range of the image sensor 210 is set with consideration for the resolution of the main monitor 104 and the electronic viewfinder 108. In a case where the resolution of the main monitor 104 and the electronic viewfinder 108 is lower than the resolution of the image sensor 210, the accuracy capable of being adjusted on the main monitor 104 and the electronic viewfinder 108 is limited. Therefore, it is preferable that the movable range is set such that the range that cannot be adjusted can be covered by the movement of the image sensor 210 in the main monitor 104 and the electronic viewfinder 108. Specifically, it is preferable that the movable range equal to or greater than a pixel pitch of the main monitor 104 and the electronic viewfinder 108 is secured. Accordingly, even though the focus is adjusted by using the main monitor 104 or the electronic viewfinder 108 having a low resolution, the target subject can be focused with high accuracy.

[Reference Position of Image Sensor]

Although it has been described in the aforementioned embodiment that the reference position of the image sensor 210 is set at the center of the movable range, the position set as the reference position is not limited thereto. For example, the reference position may be set at a position on the subject side (front side) from the center of the movable range, or the reference position may be set at a position on the image plane side (rear side). The user can set any position. As described above, followability can be improved by setting the reference position at the center of the movable range.

Although it has been described in the aforementioned embodiment that the reference position is set at the position of the flange back, the reference position may be set at a position different from the flange back. As described above, it is possible to maximize the optical performance of the interchangeable lens 10 at the time of performing the focusing at the reference position by setting the reference position at the flange back position.

The reference position may be variable. For example, the reference position can be appropriately switched while referring to the positional information of the image sensor 210 at the time of focusing on the past subject. The reference position can be appropriately switched according to the subject. For example, the reference position can be appropriately switched according to the moving direction of the subject. For example, for the subject that moves in one direction, the reference position is set in a direction opposite to a moving direction of an image formation point.

[Focus Detection Unit]

Although it has been described in the aforementioned embodiment that the defocus amount is detected based on the output of the phase difference detection pixel 218 formed on the imaging surface 212 of the image sensor 210, means for detecting the defocus amount is not limited thereto. Known focus detection means such as a passive method or an active method can be employed.

Although it has been described in the aforementioned embodiment that the phase difference detection pixels are arranged at regular intervals along the x direction, the phase difference detection pixels may be arranged at regular intervals along the y direction. The phase difference detection pixels may be arranged at regular intervals along the x direction and the y direction.

Although it has been described in the aforementioned embodiment that the phase difference detection pixels are arranged only in the AF area set at the center of the screen, an area where the phase difference detection pixels are arranged is not limited thereto. The phase difference detection pixels may be arranged on the whole screen.

[Image Sensor Movement Drive Unit]

Although it has been described in the aforementioned embodiment that the image sensor 210 is moved along the optical axis L by using the piezo actuator, the configuration of the image sensor movement drive unit is not limited thereto. The image sensor 210 can be moved along the optical axis L by employing a known linear-motion-type drive mechanism such as a linear motor or a leadscrew mechanism.

[Imaging Unit]

Although it has been described in the aforementioned embodiment that the present invention is applied to a single-sensor digital camera has been described as an example, the present invention can also be applied to a multi-sensor camera.

Figure 15:
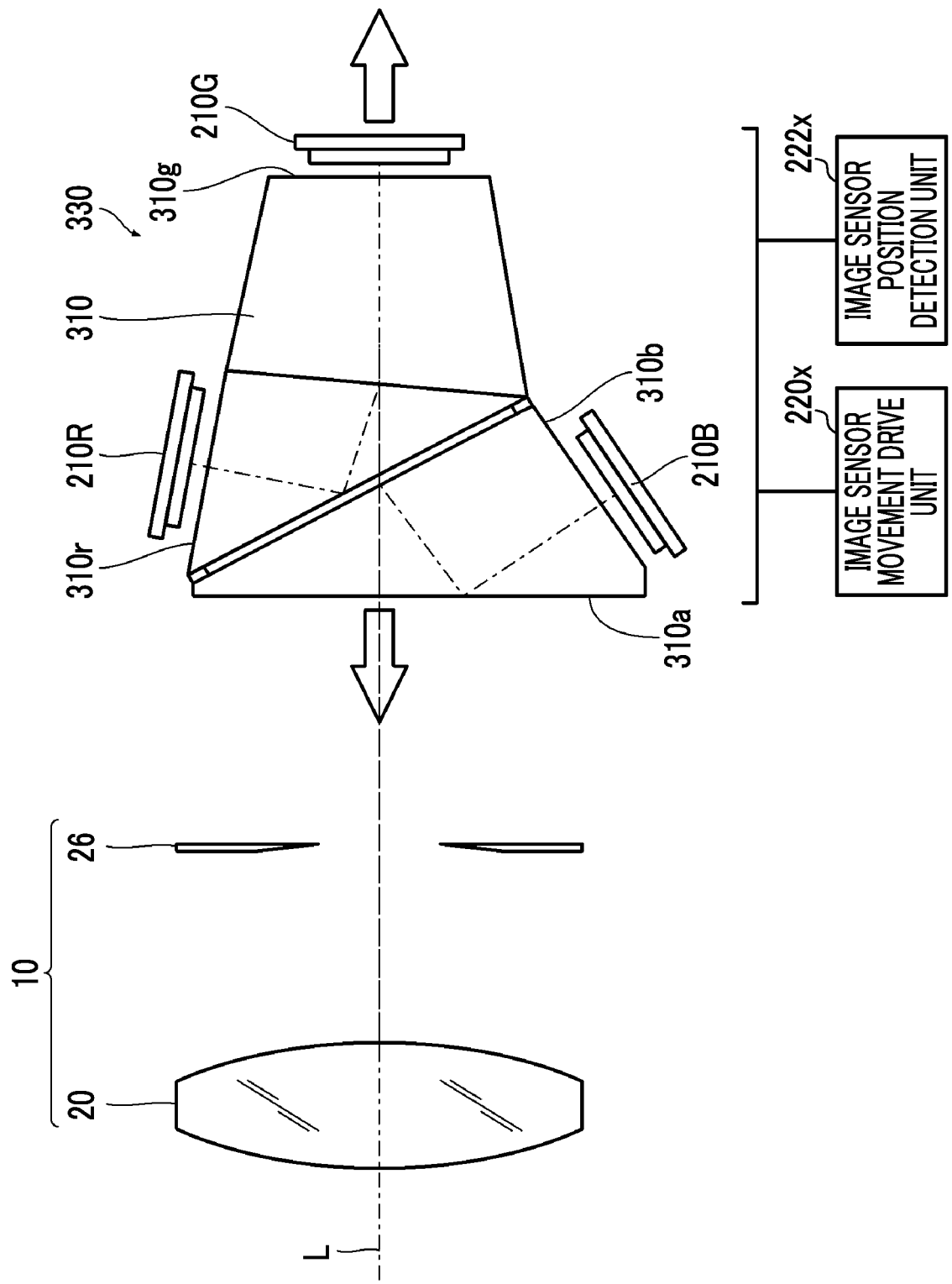
FIG. 15 is a diagram showing an example in a case where the present invention is applied to a three-sensor digital camera.

FIG. 15 is a diagram showing an example in a case where the present invention is applied to a three-sensor digital camera.

As shown in this diagram, the three-sensor digital camera includes a color separation prism 310 and three image sensors 210R, 210G, and 210B in the imaging unit.

The color separation prism 310 separates light incident on an incident surface 310a into light rays of three colors of red (R) light, green (G) light, and blue (B) light. The separated light rays of the three colors are emitted from an R light exit surface 310r, a G light exit surface 310g, and a B light exit surface 310b, respectively.

The three image sensors include an image sensor 210R that receives R light, an image sensor 210G that receives G light, and an image sensor 210B that receives B light.

The image sensor 210R that receives the R light is disposed so as to face the R light exit surface 310r, and receives the R light emitted from the R light exit surface 310r.

The image sensor 210G that receives the G light is disposed so as to face the G light exit surface 310g, and receives the G light emitted from the G light exit surface 310g.

The image sensor 210B that receives the B light is disposed so as to face the B light exit surface 310b, and receives the B light emitted from the B light exit surface 310b.

The three image sensors 210R, 210G, and 210B are arranged at positions at which optical path lengths from the incident surface 310a of the color separation prism 310 are the same.

The three image sensors 210R, 210G, and 210B are integrally attached to the color separation prism 310 via a holder (not shown). A unit in which the image sensors 210R, 210G, and 210B are integrally attached to the color separation prism 310 is referred to as an imaging unit 330. An image sensor movement drive unit 220x moves the imaging unit 330 back and forth along the optical axis L. An image sensor position detection unit 222x detects a position of the imaging unit 330 relative to the reference position.

[Imaging Lens]

Although it has been described in the aforementioned embodiment that the focus is adjusted by moving the focus lens back and forth along the optical axis, a focus adjustment mechanism of the imaging lens is not limited thereto. A liquid lens or a liquid crystal lens can be used as the focus lens. In the liquid lens and the liquid crystal lens, the focus is adjusted by using a change in refractive index.

Although it has been described in the aforementioned embodiment that the focus lens is driven by the actuator such as a linear motor, the focus lens may be manually moved by using a cam mechanism or a helicoid gear.

[Imaging Device]

Although it has been described in the aforementioned embodiment that the present invention is applied to the digital camera, the application of the present invention is not limited thereto. For example, the present invention can be applied to a video camera, a television camera, and a cinema camera, and can be similarly applied to electronic devices (for example, a mobile phone, a smartphone, a tablet personal computer, and a laptop personal computer) having an imaging function.

In the above-described embodiment, the case where the present invention is applied to an interchangeable lens type digital camera has been described as an example. However, the present invention can be similarly applied to a camera in which an imaging lens is integrated in a camera main body.

[Others]

Although it has been described in the aforementioned embodiment that each of the image sensor movement controller includes the microcomputer, the hardware configuration for realizing the functions is not limited thereto. These functions can be realized by various processors. A CPU which is a general-purpose processor functioning as a processing unit that performs various processing by executing software (program) and a dedicated electric circuit which is a processor having a circuit configuration designed as a dedicated circuit in order to perform specific processing such as programmable logic device (PLD) and application specific integrated circuit (ASIC) of which a circuit configuration can be changed after field-programmable gate array (FPGA) is manufactured are included in the various processors.

One processing unit may be constituted by one of these various processors, or may be constituted by two or more processors of the same type or different types. For example, one processing unit may be constituted by a plurality of FPGAs or a combination of a CPU and FPGA.

A plurality of processing units may be constituted by a single processor. As an example in which the plurality of processing units is constituted by one processor, there is a first example in which one processor is constituted by a combination of one or more CPUs and software or one processor functions as the plurality of processing units as represented by a computer such as a client or server. There is a second example in which as represented by system on chip (SoC), a processor that realizes the functions of the entire system including the plurality of processing units by a single integrated circuit (IC) chip is used. As described above, the various processing units are constituted by using one or more of the various processors as a hardware structure.

The hardware structures of these various processors are more specifically electric circuits in which circuit elements such as semiconductor elements are combined.

EXPLANATION OF REFERENCES

1: digital camera
10: interchangeable lens
12: lens barrel
14: lens operation unit
16: focus ring
18: stop ring
20: focus lens
22: focus lens drive unit
24: focus lens position detection unit
26: stop
28: stop drive unit
30: lens controller
30a: focus lens drive controller
30b: stop drive controller
100: camera main body
102: mount
104: main monitor
104a: LCD driver 106: sub monitor
106a: LCD driver
108: electronic viewfinder (EVF)
108a: LCD driver
110: camera operation unit
111: sensitivity dial
112: delete button
113: power lever
114: shutter button
115: drive button
116: sub monitor illumination button
117: shutter speed dial
118: playback button
119: front command dial
120: rear command dial
121: focus lever
122: quick menu button
123: menu/OK button
124: selector button
125: display/BACK button
126: first function button
127: second function button
128: third function button
129: fourth function button
130: fifth function button
210: image sensor
210B: image sensor
210G: image sensor
210R: image sensor
212: imaging surface
214: AF area
216: normal pixel
218: phase difference detection pixel
218A: first phase difference detection pixel
218B: second phase difference detection pixel
220: image sensor movement drive unit
220x: image sensor movement drive unit
222: Image sensor position detection unit
222x: image sensor position detection unit
224: image sensor drive unit
226: analog signal processing unit
228: analog-to-digital converter (ADC)
230: digital signal processing unit
232: phase difference AF processing unit
234: memory card interface
236: memory card
250: camera controller
250a: image sensor movement controller
310: color separation prism
310a: incident surface
310b: B light exit surface
310g: G light exit surface
310r: R light exit surface
330: imaging unit
A: subject
E: end portion
L: optical axis
R0: reference position
W: movable range of image sensor
S11 to S17: processing procedure of tracking control
S21 to S27: processing procedure of tracking control

What is claimed is:

1. An imaging device comprising:
an imaging lens that has a focus adjustment function for performing manual focusing;
an image sensor that images a subject via the imaging lens;
an image sensor movement driver that physically moves the image sensor along an optical axis; and
an image sensor movement controller, including processing circuitry, that controls the movement of the image sensor to start tracking the subject based on a detected defocus amount in a case where the subject is focused by manual focusing of the imaging lens,
wherein one of the following is implemented in the imaging device:
wherein the image sensor movement controller ends the tracking of the subject in a case where the image sensor reaches an end portion of a movable range, and moves the image sensor to a reference position,
wherein the image sensor movement controller ends the tracking of the subject in a case where the image sensor reaches an end portion of a movable range, and causes the image sensor to stand by at a position of the end portion until the subject is focused again,
wherein the image sensor movement controller determines that the subject is focused in a case where the detected defocus amount is continuously equal to or less than a threshold value for a predetermined time,
wherein the image sensor movement controller determines that the subject is focused in a case where the detected defocus amount is continuously equal to or less than a first threshold value for a predetermined time and a change amount of the detected defocus amount is continuously equal to or less than a second threshold value for a predetermined time, or
wherein the imaging device further comprises a tracking mode automatic switcher that turns on a tracking mode in a case where the subject is continued to be focused for a predetermined time, and the image sensor movement controller controls the movement of the image sensor to track the subject in a case where the tracking mode is turned on.

2. The imaging device according to claim 1,
wherein the image sensor movement controller moves the image sensor to the reference position by moving the image sensor at a moving speed corresponding to a change of the detected defocus amount.

3. The imaging device according to claim 2,
wherein the reference position of the image sensor is set at a flange back position defined by the imaging lens.

4. The imaging device according to claim 1,
wherein the detected defocus amount is based on outputs of a plurality of phase difference detection pixels formed on an imaging surface of the image sensor.

5. The imaging device according to claim 1, further comprising:
a tracking mode manual switcher that manually switches between turned-on and turned-off of a tracking mode,
wherein the image sensor movement controller controls the movement of the image sensor to track the subject in a case where the tracking mode is turned on.

6. The imaging device according to claim 1, further comprising:
a monitor or an electronic viewfinder on which an image captured by the image sensor is displayed in real time,
wherein resolution of the monitor and the electronic viewfinder is lower than resolution of the image sensor.

7. An imaging device main body comprising:
a mount to which an imaging lens having a focus adjustment function for performing manual focusing is attached;
an image sensor that images a subject via the imaging lens;

an image sensor movement driver that physically moves the image sensor along an optical axis; and an image sensor movement controller, including processing circuitry, that controls the movement of the image sensor to track the subject based on a detected defocus amount in a case where the subject is focused by manual focusing of the imaging lens, wherein one of the following is implemented in the imaging device:

wherein the image sensor movement controller ends the tracking of the subject in a case where the image sensor reaches an end portion of a movable range, and moves the image sensor to a reference position, or wherein the image sensor movement controller ends the tracking of the subject in a case where the image sensor reaches an end portion of a movable range, and causes the image sensor to stand by at a position of the end portion until the subject is focused again.

8. An imaging device comprising:

an imaging lens that has a focus adjustment function;

an image sensor that images a subject via the imaging lens;

an image sensor movement driver that physically moves the image sensor along an optical axis; and an image sensor movement controller, including processing circuitry, that controls the movement of the image sensor to track the subject based on a detected defocus amount in a case where the subject is focused, wherein the image sensor movement controller returns the image sensor to a reference position by moving the image sensor at a moving speed corresponding to a change of the detected defocus amount, and wherein one of the following is implemented in the imaging device:

wherein the reference position of the image sensor is set at a flange back position defined by the imaging lens, wherein the image sensor movement controller ends the tracking of the subject in a case where the image sensor reaches an end portion of a movable range, and causes the image sensor to stand by at a position of the end portion until the subject is focused again, wherein the image sensor movement controller determines that the subject is focused in a case where the detected defocus amount is continuously equal to or less than a threshold value for a predetermined time, wherein the image sensor movement controller determines that the subject is focused in a case where the detected defocus amount is continuously equal to or less than a first threshold value for a predetermined time and a change amount of the detected defocus amount is continuously equal to or less than a second threshold value for a predetermined time, or wherein the imaging device further comprises a tracking mode automatic switcher that turns on a tracking mode in a case where the subject is continued to be focused for a predetermined time, and the image sensor movement controller controls the movement of the image sensor to track the subject in a case where the tracking mode is turned on.

9. The imaging device according to claim 8, wherein the detected defocus amount is based on outputs of a plurality of phase difference detection pixels formed on an imaging surface of the image sensor.

10. The imaging device according to claim 8, further comprising:

a tracking mode manual switcher that manually switches between turned-on and turned-off of a tracking mode, wherein the image sensor movement controller controls the movement of the image sensor to track the subject in a case where the tracking mode is turned on.

11. The imaging device according to claim 8, further comprising:

a monitor or an electronic viewfinder on which an image captured by the image sensor is displayed in real time, wherein resolution of the monitor and the electronic viewfinder is lower than resolution of the image sensor.

* * * * *